May 27, 1941.  L. N. LEHMAN  2,243,806
ACCOUNTING MACHINE
Filed Jan. 6, 1937  9 Sheets—Sheet 1
FIG. 1
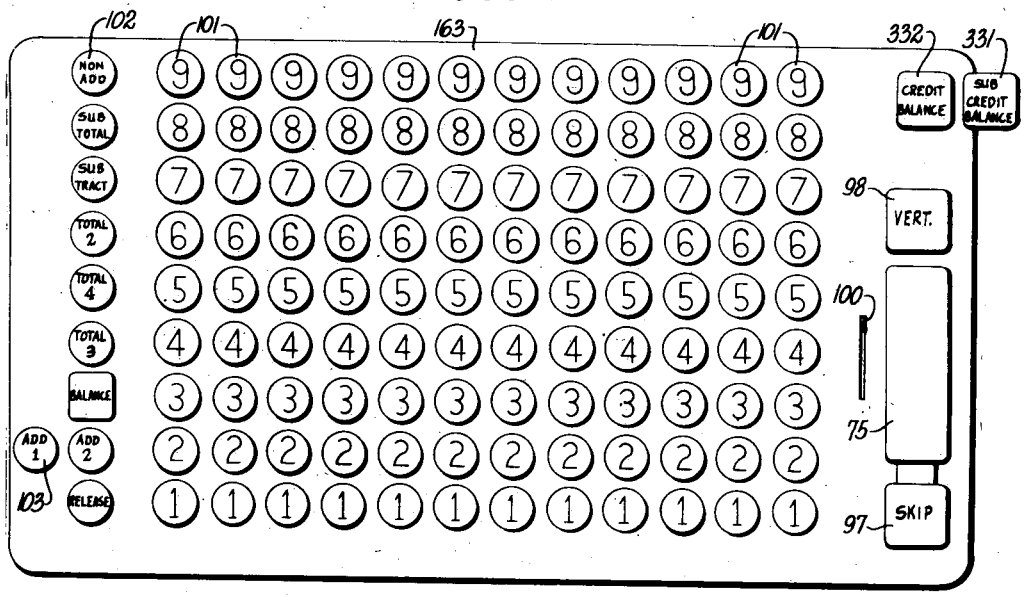
FIG. 2
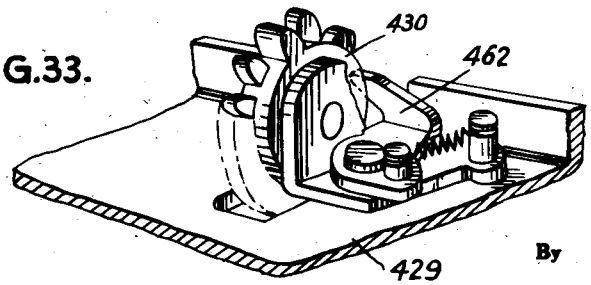
FIG. 33.
Inventor
Laurence N. Lehman
By
Earl Beust
His Attorney May 27, 1941.　　　L. N. LEHMAN　　　2,243,806
ACCOUNTING MACHINE
Filed Jan. 6, 1937　　　9 Sheets-Sheet 2

FIG. 3

Inventor
Laurence N. Lehman
By
Earl Benst
His Attorney

May 27, 1941.  L. N. LEHMAN  2,243,806
ACCOUNTING MACHINE
Filed Jan. 6, 1937  9 Sheets-Sheet 3
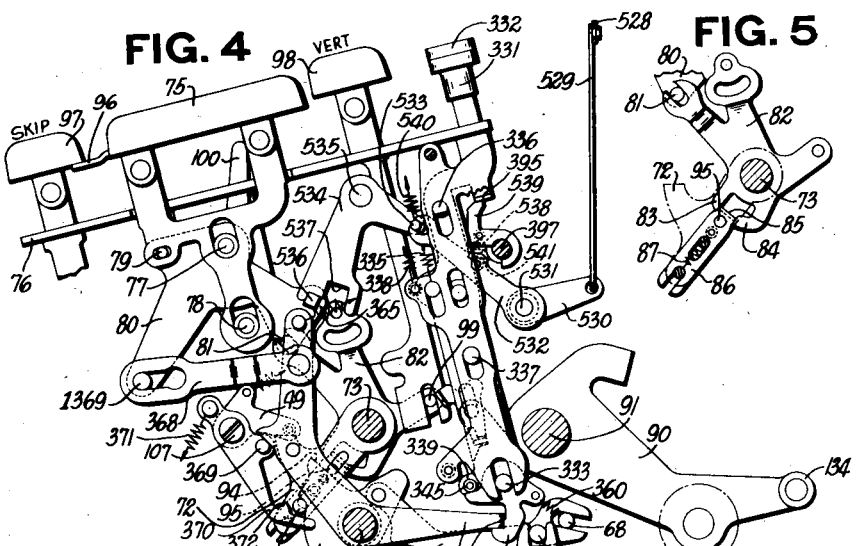
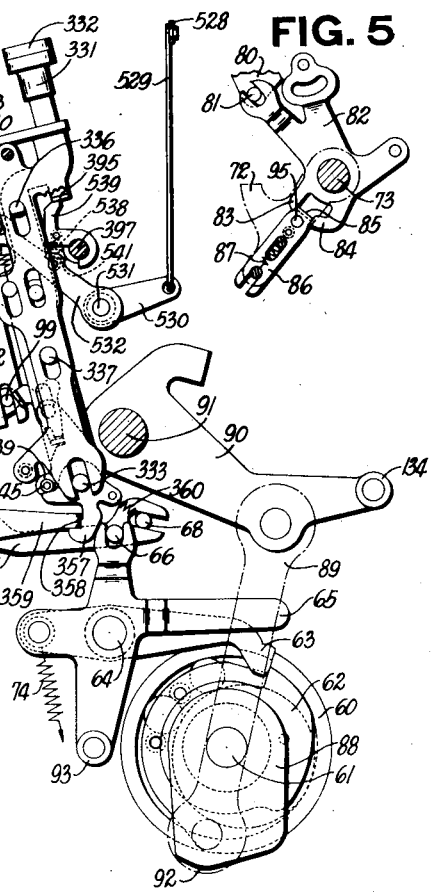
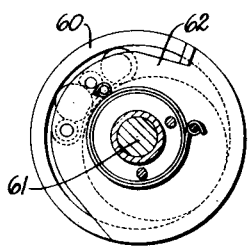
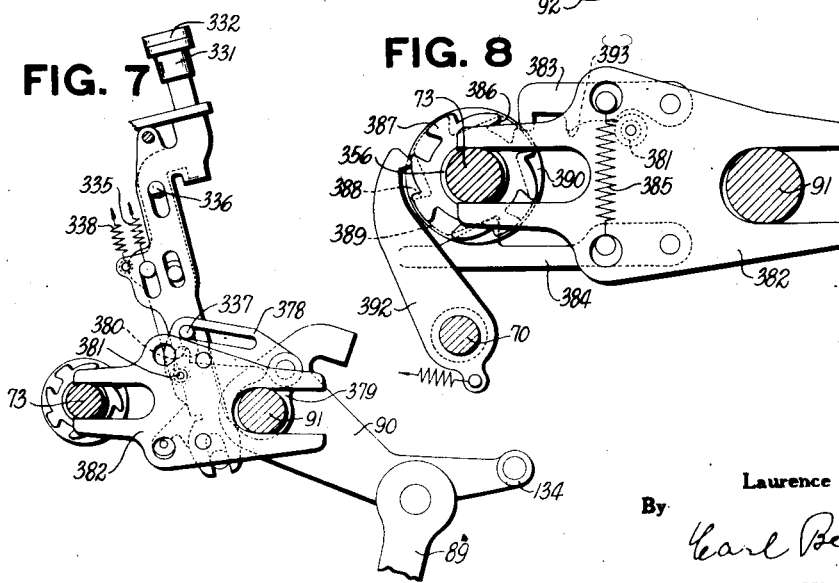
Inventor
Laurence N. Lehman
By Earl Benst
His Attorney Inventor
Laurence N. Lehman
By
Carl Benst
His Attorney May 27, 1941.　　L. N. LEHMAN　　2,243,806
ACCOUNTING MACHINE
Filed Jan. 6, 1937　　9 Sheets-Sheet 5
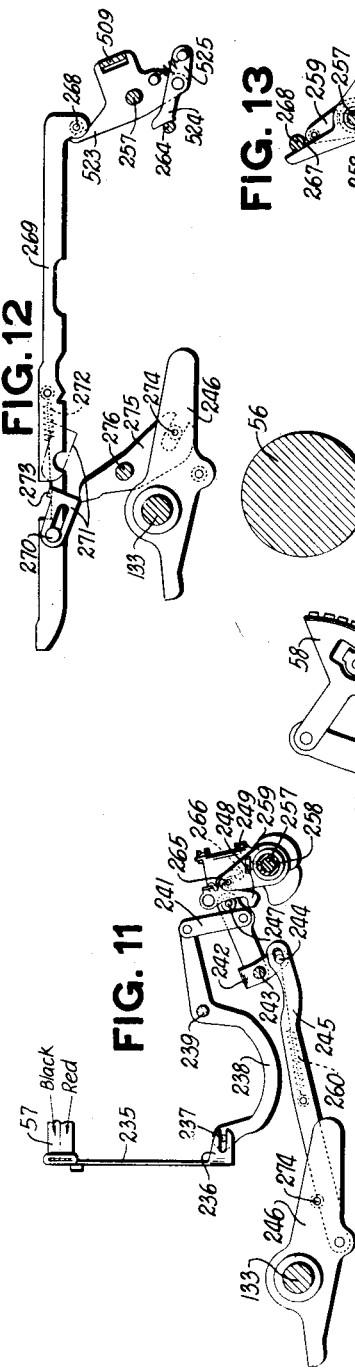
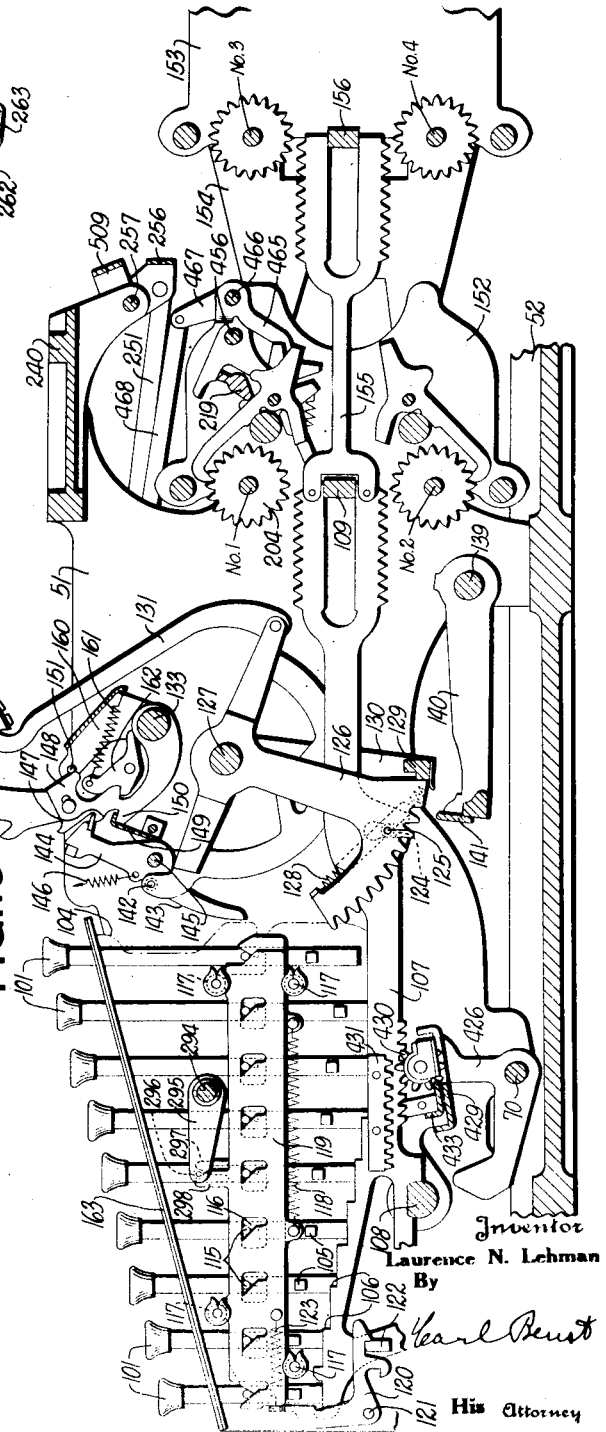
Inventor
Laurence N. Lehman
By
Earl Benst
His Attorney

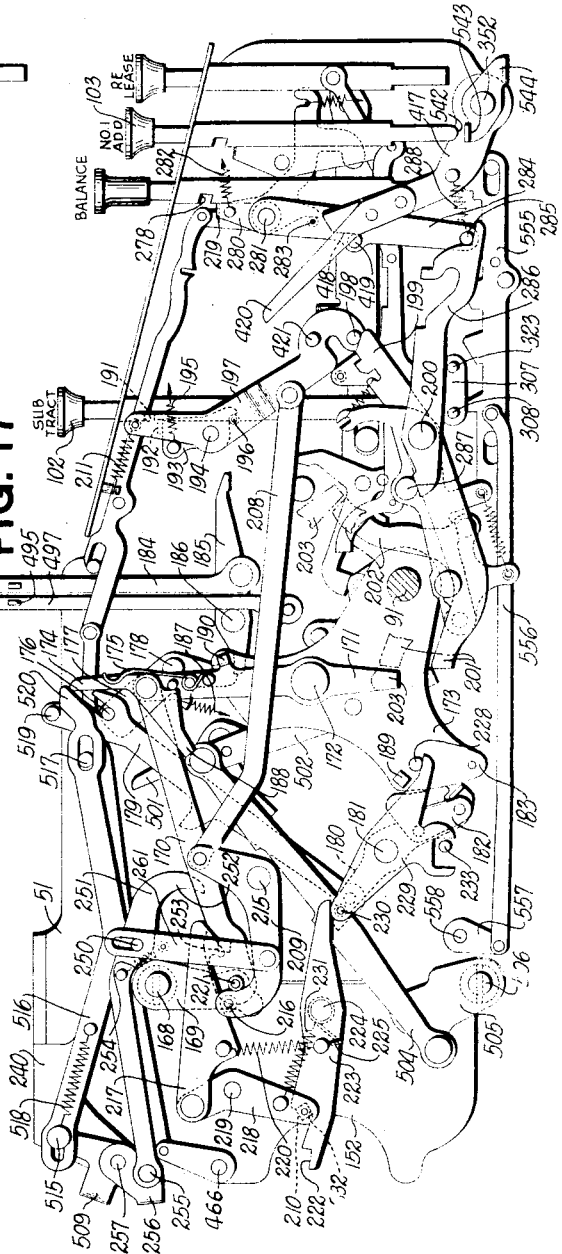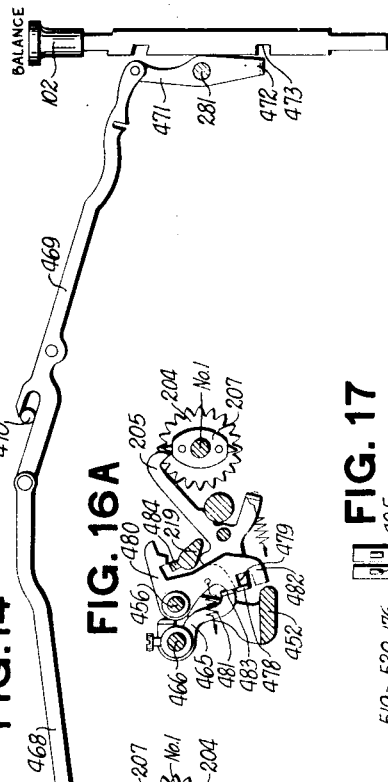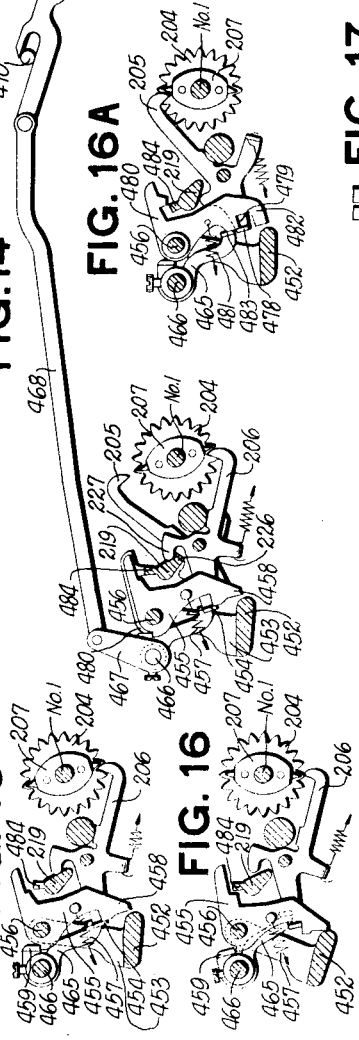

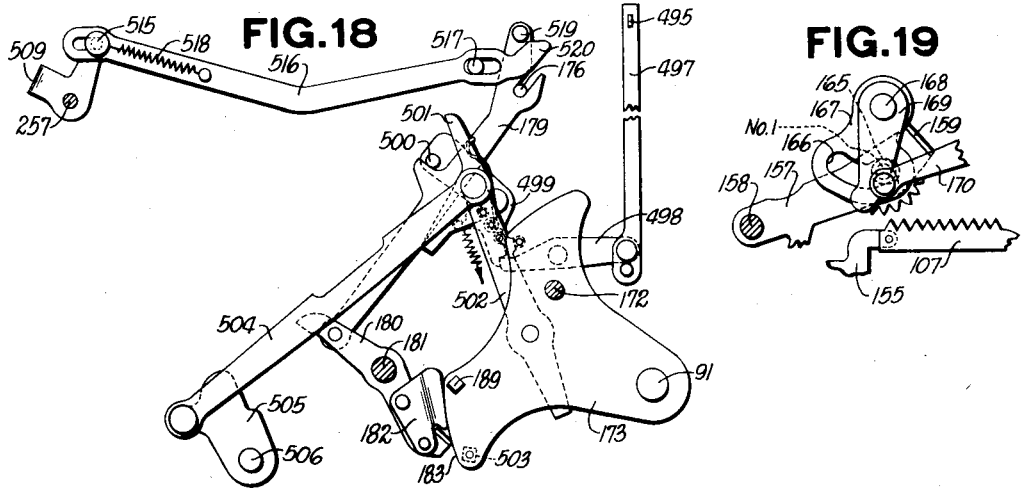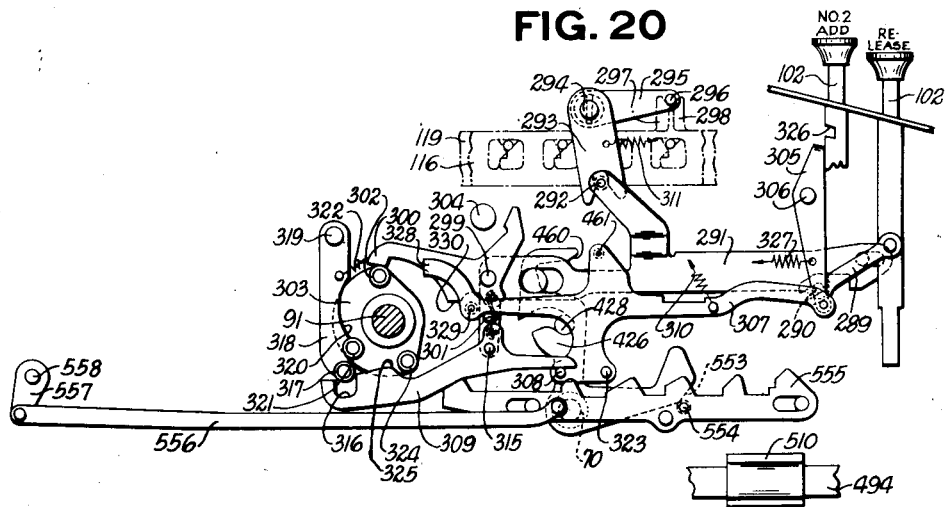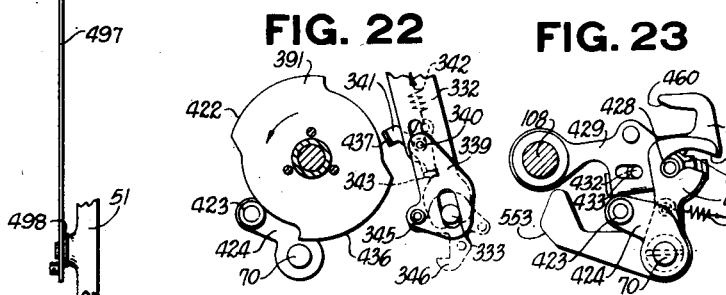

May 27, 1941.	L. N. LEHMAN	2,243,806
ACCOUNTING MACHINE
Filed Jan. 6, 1937	9 Sheets-Sheet 8

Inventor
Laurence N. Lehman
By
Carl Berst
His Attorney

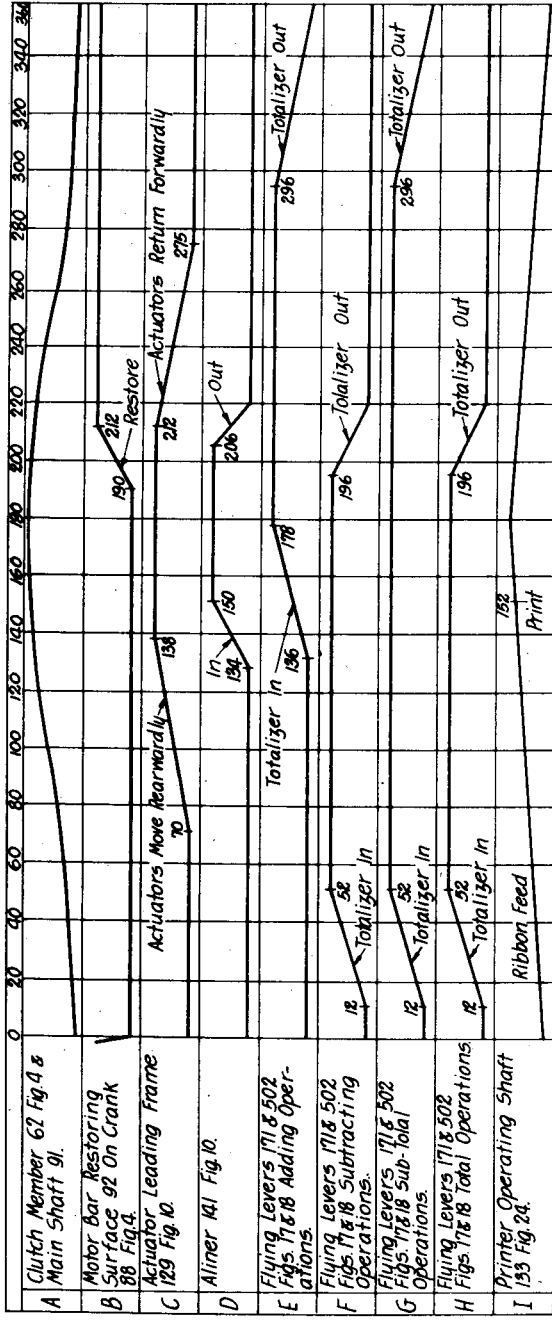
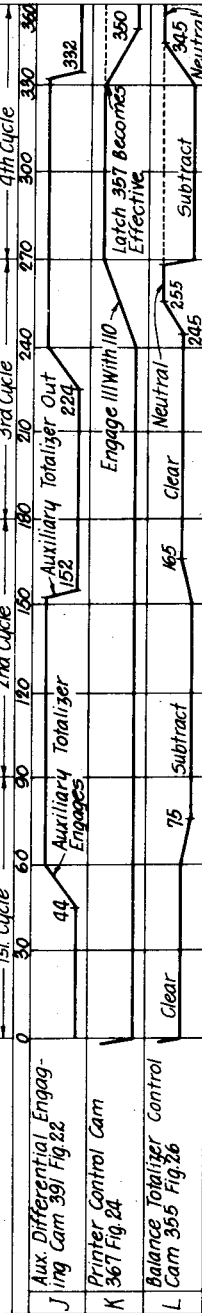
FIG. 32

Patented May 27, 1941

2,243,806

UNITED STATES PATENT OFFICE 2,243,806

ACCOUNTING MACHINE

Laurence N. Lehman, Dayton, Ohio, assignor to The National Cash Register Company, Dayton, Ohio, a corporation of Maryland Application January 6, 1937, Serial No. 119,255

29 Claims. (Cl. 235—60)

This invention relates to calculating, accounting and analogous machines and is particularly directed to an automatic overdraft mechanism for such machines.

The present invention is shown embodied in the well known Ellis type of accounting machine illustrated and described in Letters Patent of the United States No. 1,197,276, issued September 5, 1916, to Halcolm Ellis, U. S. Patent No. 1,203,863, issued November 7, 1916, to Halcolm Ellis, and U. S. Patent No. 1,536,757 issued May 5, 1925, to F. W. Bernau.

It is not the desire to limit this invention to the Ellis type of machine, as it may, with slight alterations, be adapted for use in most any type of accounting machine. Neither is it the desire to restrict the use of this invention to any particular bookkeeping system, as the flexibility of the Ellis type machine and the numerous features thereof admirably adapt it for the handling of practically any accounting problem in connection with present-day business systems.

Broadly, it is an object of this invention to provide means to record the sub-total of an overdraft and to retain the overdraft in the balance totalizer for further computations.

Another object of this invention is the provision of means for recording the true negative balance of an overdraft and for preserving the complement of the overdraft for further computations.

Still another object of this invention is to furnish means to convert the complement of an overdraft into a true negative number so that the true negative number can be recorded, and to change the true negative number back into a complementary number, in preparation for further computations.

A further object is to supply a machine which functions automatically to register and record sub-totals and totals of overdrafts.

A further object is the provision of means to control addition in certain of the totalizers during an overdraft operation.

A still further object of this invention is to supply means to automatically control the cycling of the machine in overdraft operations to cause a complement of an overdraft to be changed into a true negative amount, said true negative amount recorded, and the complement thereof reentered in the balance totalizer in one continuous operation of the machine.

Another object is the provision of means to prevent the machine from cycling until the manipulative means, which initiates overdraft operations, is fully depressed.

With these and incidental objects in view, the invention includes certain novel features of construction and combinations of parts, the essential elements of which are set forth in the appended claims and a preferred form or embodiment of which is hereinafter described with reference to the drawings which accompany and form a part of this specification.

In the drawings:

Fig. 1 is a diagrammatic plan view of the keyboard.

Fig. 2 illustrates a facsimile of a fragment of a statement or ledger card used in the machine of this invention and its associated journal sheet.

Fig. 3 is a side elevation as observed from the right of the machine, illustrating in particular the machine releasing mechanism, the machine driving mechanism and the overdraft mechanism.

Fig. 4 is a detail view of the releasing and driving mechanisms and a part of the overdraft mechanism.

Fig. 5 is a detail view of a part of the mechanism for preventing unintentional repeat operations on the machine.

Fig. 6 is a detail view of the clutch mechanism of the present machine.

Fig. 7 illustrates in detail how depression of either of the overdraft keys couples the machine driving mechanism to the overdraft control mechanism.

Fig. 8 is a detail view of the driving means for the overdraft control cams.

Fig. 10 is a vertical sectional view taken just to the right of one of the amount banks, showing the manner in which the amount keys control the actuation of the totalizers and the printing mechanism.

Fig. 11 is a detail view of the mechanism that moves the inking ribbon to and from printing position.

Fig. 12 is a detail view of the mechanism for returning the ribbon color control shaft to normal or black printing position at the end of each machine operation.

Fig. 13 is a detail view of a part of the ribbon color control mechanism.

Fig. 14 is a detail view, as observed from the left-hand side of the machine, of the mechanism for locking the balance key against depression when the balance totalizer is overdrawn.

Fig. 15 is a detail view showing the position of a part of the mechanism shown in Fig. 14 before the occurrence of an overdraft.

Fig. 16 is a detail view showing the position of the mechanism shown in Fig. 15, after the occurrence of an overdraft.

Figure 9:
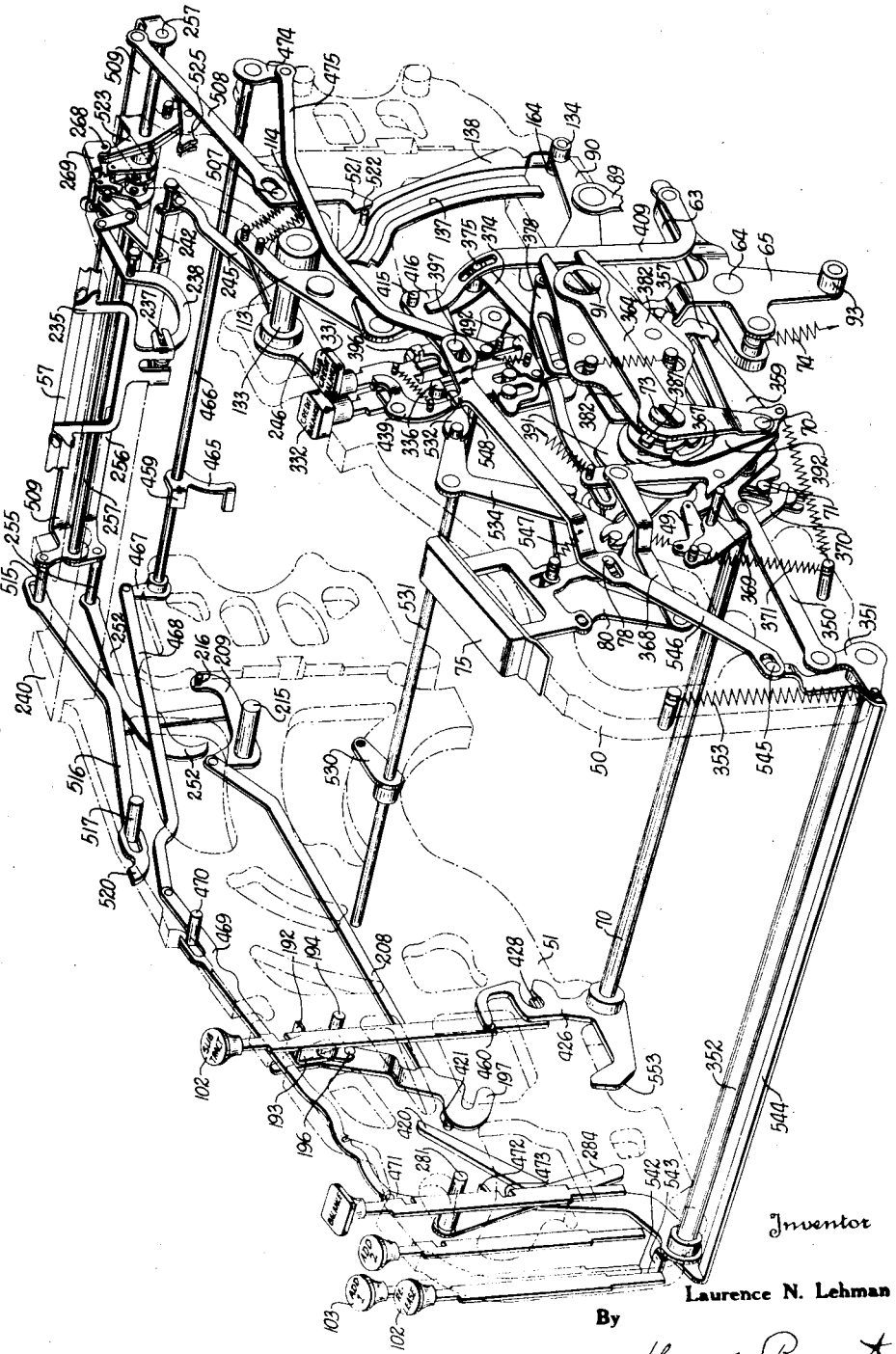
Fig. 9 is a perspective view of the mechanism of the present invention. In perspective views such as this, where the dot-and-dash lines of the framework do not show in front of other parts, it indicates that such framework is in back of these parts.

Fig. 16—A is a detail view of the mechanism that restores the overdraft shaft to normal position.

Fig. 17 is a left side elevation of the mechanism that controls the balance totalizer.

Fig. 18 is a detail view of the mechanism that prevents addition in the adding totalizers during an overdraft operation.

Fig. 19 is a detail of the engaging mechanism for the balance totalizer.

Fig. 20 is a left side elevation of the key releasing mechanism.

Fig. 21 illustrates the mechanism whereby the traveling carriage selects the #2 totalizer for addition.

Fig. 22 is a detail view of the cam that controls the engaging and disengaging of the auxiliary storage device.

Fig. 23 shows the mechanism operated by the cam shown in Fig. 22, for engaging and disengaging the auxiliary storage device.

Fig. 24 is a detail view of the Sub-credit balance key and a part of the mechanism associated therewith.

Fig. 25 is a detail view as observed from the front of the machine, showing the side-spacing of the Credit balance and Sub-credit balance keys and their associated parts.

Fig. 26 is a detail view of the Credit balance key and some of the parts associated therewith.

Fig. 27 is a detail view of the mechanism that returns the overdraft shaft to normal position at the end of an overdraft operation.

Fig. 28 is a detail view of the arm that releases the Credit balance and Sub-credit balance keys at the end of an overdraft operation.

Fig. 29 is a detail view, partially sectioned, of the assembly of cams that control the machine in overdraft operations.

Fig. 30 is a detail view of the cam that controls the functioning of the balance totalizer in overdraft operations.

Fig. 31 is a detail view of the mechanism that retains the Credit balance and Sub-credit balance keys depressed during overdraft operations.

Fig. 32 is a time chart graphically illustrating the movements of the different mechanisms of the machine in one cycle and multi-cycle operations.

Fig. 33 is a view showing one of the stops for the wheels of the storage device.

GENERAL DESCRIPTION

The machine embodying the instant invention is equipped with a traveling carriage, similar in appearance to those used on typewriters, adapted to be automatically or manually tabulated from one column to the next to present different portions of the record material, carried by the platen thereof, to the type carriers. The traveling carriage comprises a front feed or throat-opening device by means of which record material, such as statement or ledger sheets, may be conveniently inserted in front of the platen roll. The throat is automatically opened when the traveling carriage is returned to starting position.

When the traveling carriage reaches the terminus of its tabulated movement, it is automatically returned to starting position and in addition, by means of carriage return bars, may be returned from tabulated positions to pre-determined columnar positions.

The machine is operated by a start-stop electric motor of conventional design, and this motor is set in motion by means of any one of three starting bars conveniently located on the right-hand side of the keyboard. In addition to setting the machine in motion, one of the starting bars, when retained depressed, causes the traveling carriage to be returned to a predetermined columnar position. This starting bar also causes the traveling carriage to be automatically tabulated from one column to the next. The second starting bar causes the platen roll to be rotated to line-space record material carried thereby, and in addition prevents automatic tabulation of the traveling carriage. The third starting bar causes the traveling carriage to be skip-tabulated through one or more intervening columnar positions to a predetermined columnar position.

The machine embodying this invention has a Balance or add-subtract totalizer and three adding totalizers arranged in vertical pairs at the rear of the machine. The Balance totalizer is selected for addition and subtraction and the adding totalizers are selected for addition by means of control elements located in columnar positions on the traveling carriage, in cooperation with hanging bar levers. The other functions of the machine, including non-add, sub-total and total operations, are controlled by means of a row of control keys located on the extreme left of the keyboard.

The present machine has a plurality of denominational rows of amount keys, which, when depressed, position their corresponding actuators commensurate with the value thereof and the actuators in turn position their respective printing sectors and corresponding wheels of the selected totalizer or totalizers, in proportion thereto. In sub-total and total operations, the wheels of the selected totalizer position the amount actuators and the printing sectors to the amounts standing on said wheels as they are returned to zero position. In total operations, the wheels of the selected totalizer are disengaged from the amount actuators after said wheels have been reset to zero, to leave the totalizer in a cleared condition, and in sub-total operations the wheels of the selected totalizer remain in engagement with the actuators after having been returned to zero and are returned thereby to their original positions. In subtract operations the wheels of the Balance totalizer are reversely rotated by the actuators to subtract therefrom the value of the amount set up on the amount keys.

Adding, subtracting, sub-total and total operations consist of one cycle of movement of the operating mechanism. In former machines, overdraft operations, in which the complementary amount of an overdraft was transposed to a true negative balance and this true negative balance recorded, consisted of three cycles of movement of the operating mechanism. In the present machine, an overdraft operation consists of four cycles, during which either a sub-total or total of the overdraft may be recorded.

A sub-overdraft or sub-credit balance operation is initiated by the depression of a Sub-credit balance key, and in the first cycle of said sub-credit balance operation the complementary amount of the overdraft is cleared from the Balance totalizer and added in an auxiliary storage device. In the second cycle of a sub-overdraft or sub-credit balance operation the auxiliary storage device is cleared and the complement of the overdraft is subtracted from the zeroized balance totalizer, leaving the true negative balance in said balance totalizer. In the third cycle the balance totalizer is again cleared and the true negative balance is added in the wheels of the auxiliary storage device and in the fourth cycle the auxiliary storage device is again cleared and the true negative balance stored therein is subtracted from the zeroized balance totalizer, leaving the complement of the overdraft in said balance totalizer, and in addition, the auxiliary storage device positions the type carriers to record the amount of the true negative balance.

It will be seen that in this type of overdraft operation the complementary amount of the overdraft is reentered in the balance totalizer and amounts may be added to and subtracted from this complementary overdraft in the usual manner. Depressing the Sub-credit balance key renders mechanism effective that causes the balance totalizer to be engaged with the actuators in the fourth cycle of an overdraft operation, and as explained above, the auxiliary storage device is cleared and the true negative balance is subtracted from the balance totalizer. However, when the credit balance or overdraft key is depressed, this mechanism is not rendered effective, and consequently the balance totalizer remains out of engagement with the actuators during the fourth cycle of an ovedraft operation and remains in a zeroized condition, in which condition it was placed during the third cycle of said overdraft operation.

The occurrence of an overdraft in the balance totalizer is made manifest to the operator by the automatic locking of the balance key and the simultaneous unlocking of the Sub-credit balance and Credit balance keys. After the occurrence of an overdraft, if an amount is added into the balance totalizer large enough to overcome said overdraft, the Balance key is automatically unlocked and the Sub-credit balance and Credit balance keys are simultaneously locked against depression.

The machine starting or releasing mechanism is restored to normal or ineffective position at the end of each cycle of operation and is retained in said normal position by a latch mechanism that is controlled by the starting bars. Depression of either the Sub-credit balance or the Credit balance key causes the latch mechanism for the machine starting mechanism to be latched in ineffective position and this causes the machine to cycle automatically until, near the end of the fourth cycle of operation, the depressed Sub-credit balance or Credit balance key is released, which permits the latch mechanism to engage and retain the starting mechanism in ineffective or normal position.

In overdraft operations, the machine is controlled by an assembly of cams which are driven one revolution during the four cycles of an overdraft operation by a reciprocating slide which is connected to the machine operating mechanism by the depression of either the Sub-credit balance or Credit balance key.

The latch mechanism, that retains the Sub-credit balance and Credit balance keys depressed during an overdraft operation, is arranged to prevent the starting mechanism from functioning until said keys are latched in depressed position.

Depressing the Credit balance key, which leaves the balance totalizer in a cleared state, causes the overdraft latch mechanism to be returned to normal position to unlock the Balance key and lock the Sub-credit balance and Credit balance keys against depression.

The printer mechanism is uncoupled from its driving means during the first three cycles of an overdraft operation to prevent the recording of undesirable and erroneous figures upon the record material. However, in the fourth cycle of an overdraft operation, the printing mechanism is coupled to its driving mechanism so that the true negative balance will be recorded at this time.

The present invention also embraces mechanism that makes it necessary to tabulate the traveling carriage to certain predetermined columnar positions before the Sub-credit balance or Credit balance keys can be depressed.

The overdraft mechanism and other mechanism of the machine pertinent thereto will be described in detail in the ensuing pages.

DETAILED DESCRIPTION

*Framework*

The mechanism of the machine embodying this invention is supported by a right frame 50 and a left frame 51 (Figs. 3, 9 and 10) mounted upon a machine base 52, and rigidly supported in relation to each other by means of various crossframes and rods, one of said crossframes 53 being shown in Fig. 3. The mechanism of the machine is enclosed in a suitable case or cabinet 54 (Fig. 3) secured to the machine base. The case 54 has ways thereon, which, in co-operation with similar ways on the frame of a traveling carriage 55, support the rearward end of said traveling carriage for transverse tabulating movement. The front end of the traveling carriage is supported by means of rollers thereon, in cooperation with a track formed on the case 54. The traveling carriage 55 rotatably supports a platen roll 56 adapted to present record material carried thereby to an inking ribbon 57, a plurality of amount type sectors 58 and a symbol type sector 59 (Fig. 3). The platen 56 is of front feed construction, which permits record material to be readily inserted and removed from in front of the platen without being wound around said platen roll. When the traveling carriage is returned to starting position the throat of the front feed device is automatically opened to facilitate the removal and insertion of record material.

The front feed mechanism is not fully illustrated herein, but a full disclosure of this mechanism may be had by referring to the co-pending application for Letters Patent of the United States, Serial Number 653,838, which was filed January 27, 1933, by R. A. Christian.

After the printing stroke of each machine operation, the traveling carriage is automatically tabulated from one column to the next and in addition may be manually tabulated from one column to the next when desired. After the traveling carriage reaches the terminus of its tabulated movement, it is automatically returned to starting position and in addition, by means of manipulative devices, may be returned from tabulated positions to predetermined columnar positions.

A complete illustration and description of the selective carriage return mechanism may be had by referring to the co-pending application for Letters Patent of the United States, Serial Number 732,252; which was filed June 25, 1934, by R. A. Christian, and which was issued on June 1, 1937, as Patent No. 2,082,098.

Operating mechanism

The machine embodying the present invention is preferably operated by a start-stop electric motor, not here shown but of the type disclosed in the application for Letters Patent of the United States, Serial Number 697,449, which was filed November 10, 1933, by Charles H. Arnold, and which issued on January 3, 1939, as Patent No. 2,142,341. The operating motor is geared to a driving member 60 (Figs. 4, 6 and 9) of a clutch device, said driving member being rotatably mounted upon a pin 61, secured in the motor frame. The driving member 60 cooperates with a driven clutch member 62, also rotatably supported by the pin 61 and normally held out of engagement with the driving member 60 by means of a shoulder on said driven member in cooperation with a clutch release lever 63, loose on a stud 64 in the motor frame, and integral with a control lever 65.

An upward extension of the lever 65 is bifurcated to embrace a stud 66 in a pitman 67, the rearward end of which has a slot which slides on a stud 68 in the frame 50. The forward end of the pitman 67 is pivotally connected to a release plate 69, turnably mounted on an auxiliary storage device shaft 70 journaled in the frames 50 and 51. A stud 71 (Figs. 4 and 5) in a lever 72 loose on a stud 73 in the frame 50, in cooperation with a shoulder on the plate 69, normally retains the clutch lever 63 in effective position, as shown in Fig. 4, against the action of a spring 74, which is tensioned to urge said clutch lever out of engagement with the driven member 62 of the clutch device.

Depressing a machine starting bar 75, the upper end of which extends through an opening in a plate 76 secured to the frame 50 and which is slidably mounted by means of parallel slots therein in cooperation with stationary studs 77 and 78 secured in the frame 50, causes a slot in said starting bar 75, in cooperation with a stud 79 in a lever 80, to rock said lever 80 counter-clockwise on its pivot 77. Counter-clockwise movement of the lever 80, by means of a stud 81 therein in cooperation with a bifurcated extension of a lever 82 fulcrumed on the stud 73, rocks said lever 82 clockwise. The lever 82 (Fig. 5) has parallel surfaces formed by fingers 83 and 84 which engage a bent-over ear 85 on a slide 86 mounted on the lever 72 by means of slots therein in cooperation with stationary studs in said lever 72.

A spring 87 tensioned between the lever 72 and the slide 86 urges said slide downwardly to normally maintain the ear 85 in coactive engagement with the fingers 83 and 84 whereupon clockwise movement of the lever 82, as explained above, carries the lever 72 in unison therewith. Clockwise movement of the lever 72 moves the stud 71 out of engagement with the shoulder on the plate 69 to release the lever 63 to the action of the spring 74, which disengages said lever from the shoulder on the clutch driven member 62 to operatively connect said driven member to the driving member 60. Counter-clockwise movement of the lever 63 also operates a switch that starts the electric motor operating.

Integral with the clutch driven member 62 (Fig. 4) is a crank 88 pivotally connected by a link 89 to a lever 90, secured on a main drive shaft 91 journaled in the frames 50 and 51. The motor drives the clutch members 60 and 62 in a counter-clockwise direction and one revolution of the driven member 62, by means of the crank 88 and the link 89, oscillates the lever 90 and the main driving shaft 91 first counter-clockwise and back to normal position through an approximate angle of 60 degrees (see space A of chart Fig. 32). This counter-clockwise and clockwise movement of the main shaft 91 is sufficient to operate the machine in adding, subtracting, and total-taking operations and will be referred to as a machine cycle. After the clutch driven member 62 has completed one revolution of movement a camming surface 92 on the edge of the crank 88, in cooperation with a roller 93 in a downward extension of the lever 65, rocks said lever and its companion lever 63 clockwise to move said lever 63 into the path of the shoulder on the clutch driven member and to return the plate 69 clockwise until the shoulder thereon moves beyond the stud 71 to permit the levers 72 and 82 to be returned to normal position by a spring pulled member 49 (Fig. 4) to move the stud 71 into the path of the shoulder on the plate 69, to retain the levers 63 and 65 in ineffective positions, as here shown, when the camming surface 92 moves beyond the roller 93 (see space B of chart Fig. 32).

Counter-clockwise movement of the levers 72 and 82 to normal position also returns the lever 80 clockwise to restore the starting bar 75 upwardly to undepressed position. Return movement clockwise of the plate 69 (Figs. 4 and 5) causes a surface 94 thereon to engage a stud 95 in the slide 86 to shift said slide 86 upwardly to move the ear 85 into an L-shaped opening formed by the fingers 83 and 84. In case the starting bar 75 is inadvertently retained depressed, the L-shaped opening permits the lever 72 to be spring-returned counter-clockwise, independently of the lever 82 to move the stud 71 into the path of the shoulder on the plate 69 to prevent unintentional repeat operations of the machine.

An extension 96 (Fig. 4) of the starting bar 75 underlies a Skip-tabulating starting bar 97, the upper end of which is guided by an opening in the plate 76, and consequently depressing the starting bar 97 also depresses the starting bar 75 to release the machine for operation and in addition to cause the traveling carriage to be skip-tabulated to a predetermined columnar position.

The upper end of a Vertical feed starting bar 98 extends through an opening in the plate 76 while the lower end of the stem of said starting bar is slotted to receive a stud 99 in an extension of the lever 82. Therefore, depressing the starting bar 98 rocks the lever 82 clockwise to release the machine for operation in the manner explained above. Ordinarily the traveling carriage 55 (Fig. 3) tabulates automatically from one column to the next during machine operations. However, depressing the vertical feed starting bar 98, in addition to releasing the machine for operation, disables this automatic tabulating mechanism and causes the platen roll to be rotated to line-space the record material carried thereby.

The machine is also released for operation by depressing the Sub-credit balance or Credit balance keys. However, this mechanism will be explained later in connection with the overdraft mechanism.

A fingerpiece of a carriage control lever 100 (Figs. 1 and 4) protrudes through an opening in the plate 76 and said lever is pivoted on a stud in a downward extension of said plate 76. The lever 100 has three positions, and when in its #1 or upper position as here shown, the traveling carriage 55 and the starting bars 75, 97 and 98 function in the normal manner, as explained above. When the lever 100 is in its #2 or middle position, the automatic tabulation of the traveling carriage is disabled at all times, and when said lever is in its third or lower position, the automatic tabulation of the traveling carriage is disabled and the platen roll 56 is rotated each machine operation to line-space the material carried thereby.

A full disclosure of the lever 100, the machine starting bars, the tabulating mechanism, and the carriage return mechanism may be had by referring to the co-pending application for Letters Patent of the United States, Serial Number 732,252, which was filed June 25, 1934, by R. A. Christian, and which issued on June 1, 1937, as Patent No. 2,082,098.

Keyboard

The keyboard of the present machine comprises a plurality of denominational rows of amount keys 101 (Figs. 1 and 10), a row of control keys 102, and an add control key 103. The upper ends of said amount and said control keys extend through openings in a keyboard top plate 163. The amount keys 101 are supported in a framework composed of the plate 163 and a partition plate 104 (Fig. 10) for each row of keys, said partition plates each supporting the lower end of its respective row of keys. The control keys 102 and 103 control the different functions of the machine, including non-add, subtract, sub-total, total, and adding in the #1 and #2 totalizers. The adding function of all totalizers is also controlled by means of control elements on the traveling carriage in cooperation with hanging bar levers in the well known manner.

Inasmuch as the actuator mechanism is practically duplicated in each row of amount keys, it is believed that a description of one row of amount keys and its associated actuator mechanism will be sufficient for the purpose of this specification.

Depressing one of the amount keys 101, in the particular row illustrated in Fig. 10, moves a square stud 105 near the bottom end thereof into the path of a corresponding step 106 on an amount actuator 107 mounted for horizontal reciprocating movement by means of a slotted rod 108 in cooperation with the forward end of said actuator 107 and by means of a slotted bar 109 in cooperation with the bifurcated rearward end of said actuator 107. The rod 108 and the bar 109 are supported by the frames 50 and 51. Depressing the amount key 101 also causes a pin 115 therein, in cooperation with an angular camming surface on the nose of a corresponding hook-shaped projection on a locking detent 116 slidably mounted on the corresponding partition plate 104 by means of four rollers 117 journaled on studs in said partition plate 104, to shift said locking detent 116 rearwardly against the action of a spring 118. The spring 118 is tensioned between the locking detent 116 and a control plate 119 slidably mounted adjacent the detent 116 by means of the rollers 117.

When the pin 115 moves below the corresponding hook on the detent 116 the spring 118 returns said detent forwardly to move the hook over the stud to latch the key in depressed position. Depressing an amount key 101 also causes the pin 115, in cooperation with a corresponding angular camming surface in an opening of the control plate 119, to shift said control plate 119 forwardly against the action of the spring 118. Forward movement of the control plate 119 causes the forward end thereof, in cooperation with a bent-over ear of a zero latch 120 fulcrumed on a rod 121 supported by the keyboard framework, to rock said latch 120 counter-clockwise out of engagement with a block 122 integral with the actuator 107 to free said actuator for reciprocating movement. A spring 123 tensioned between the control plate 119 and the latch 120 maintains the bent-over ear of said latch in contact with the forward end of said control plate 119. When no amount key is depressed in this particlular row, the zero latch 120, in cooperation with the block 122, retains the actuator 107 in zero position during a machine operation.

The actuator 107 (Fig. 10) has therein a vertical slot 124 through which extends a stud 125 in a downward extension of a reducer segment 126 loose on a leading frame shaft 127 journaled in the frames 50 and 51. A spring 128, tensioned between the segment 126 and a leading frame cross-bar 129, normally maintains an edge of the segment 126 in contact with said bar 129. The leading frame bar 129 is integral with two similar downwardly extending arms 130, only one here shown, secured on the shaft 127. A link 131 pivotally connects a rearward extension of the segment 126 to the amount type sector 58 for this particular row of keys, said type sector being pivoted to an arm 132, loose on a printer shaft 133 journaled in the frame 50 and the printer framework.

Oscillation of the arm 90 (Fig. 3) in the manner explained previously, causes a roller 134 mounted thereon, in cooperation with a camming slot 135 in a plate 136 secured on the shaft 127, to rock said shaft 127 and the leading frame 129 (Fig. 10) first counter-clockwise and then back to normal position (see space C of chart Fig. 32). Initial movement counter-clockwise of the leading frame 129 by means of the spring 128 carries the segment 126 and the actuator 107 rearwardly in unison therewith until the step 106 on said actuator engages the corresponding stud 105 in the depressed amount key, to position said actuator 107, the segment 126, and by means of the link 131 the amount type sector 58 in proportion to the value of the depressed amount key. After the parts have been thus positioned the leading frame 129 completes its initial movement rearwardly, flexing the spring 128. After the segment 126 has been positioned, a roller 164 on the arm 90 (Figs. 3 and 9), similar to and on the same axis as the roller 134, in cooperation with a camming groove 137 formed in a plate 138 secured on an aliner shaft 139 journaled in the frames 50 and 51, rocks said plate 138 and said shaft 139 clockwise. Secured on the shaft 139

(Fig. 10) are two similar arms 140, only one here shown, between which extends an alining bar 141 adapted to cooperate with alining teeth in the periphery of an arcuate surface of the segment 126. Clockwise movement of the shaft 139 rocks the bar 141 into engagement with the teeth of the segment 126, to aline said segment, the actuator 107 and the printing sector 58 in set positions (see space D Fig. 32).

When the actuator 107 and the segment 126 move out of zero position a stud 142 in a forward extension of said segment 126, in cooperation with an arcuate surface 143 on the tail of a zero elimination pawl 144 pivoted on a shaft 145 supported in the printer framework, rocks said pawl counter-clockwise against the action of a spring 146. Counter-clockwise movement of the pawl 144 rocks a tooth thereon out of engagement with a similar tooth 147 on a plate 148 connected to the arm 132, to free said plate 148 and said arm 132 for printing movement.

After the leading frame 129 has completed its initial movement counter-clockwise and the actuator 107, the segment 126 and the printing sector 58 have been positioned, the printer shaft 133 receives movement, in a manner presently to be described, to cause the value of the depressed key to be recorded. The arm 90 (Fig. 24) carries a stud 110, which in all operations except overdraft operations, cooperates with a notch in the lower end of a link 111, the upper end of which is pivoted at 112 to an arm 113 flexibly connected to another arm 114 secured on the printer shaft 133. Initial movement counter-clockwise of the arm 90 moves the link 111 and the arms 113 and 114 to rock the shaft 133 and a yoke 160 (Fig. 10) secured thereon clockwise to tension a spring 161 stretched between said yoke 160 and a pawl 162 pivoted on the arm 132. The pawl 162 has a tooth which engages a similar tooth on the plate 148 and forms a yielding connection between the arm 132 and the plate 148.

After the actuator 107, the segment 126 and the sector 58 have been positioned and the leading frame 129 has reached the terminus of its initial movement rearwardly, continued movement clockwise of the printer shaft 133, by means of mechanism not shown but well known in the art, rocks a trigger 149, pivoted in the printer frame, counter-clockwise out of engagement with a tooth 150 on the plate 148 to release the printing sector 58 to the action of the tensioned spring 161 to cause said printing sector in cooperation with the inking ribbon 57 interposed between said sector and record material carried by the platen roll 56 (Fig. 3), to record the value of the depressed amount key upon the record material (see space I of chart Fig. 32).

Return movement clockwise of the arm 90 returns the printer shaft 133 counter-clockwise, causing a rod 151 extending between the arms of the yoke 160 to engage the plate 148, to return said plate, the arm 132 and the sector 58 to normal positions as shown in Fig. 10. Return movement of the arm 90 also rocks the aliner 141 (Fig. 10) out of engagement with the segment 126 and returns the leading frame 129, the segment 126 and the actuator 107 forwardly to zero positions. Prior to return movement of the actuator 107, the detent 116 is shifted rearwardly to release the depressed amount key and as the pin 115 no longer restrains rearward movement of the control plate 119, the zero latch 120 is free to engage the block 122 to latch the actuator and associated mechanism in zero positions.

Ordinarily, when no amount key is depressed, the zero elimination pawl 144, in cooperation with the tooth 147, restrains the type sector 58 against printing movement when the trigger 149 is released. However, each pawl 144 has a bent-over ear, which overlies the corresponding pawl in the next higher order, and when a key is depressed in a higher order, the pawl 144 for that order rocks all the lower order pawls 144 to ineffective positions to permit printing movement of the type sectors of the lower denominations in order to record the zeros.

Totalizers

The machine embodying this invention has four totalizers, a #1 or add-subtract totalizer and three adding totalizers, numbered respectively, 2, 3 and 4. The #1 and #2 totalizers (Fig. 10) are mounted in a framework 152 secured to the main frames 50 and 51 and the #3 and #4 totalizers are mounted in a framework 153, connected to the framework 152 by means of two end plates 154, only one here shown. The actuator 107 (Fig. 10) has teeth thereon arranged to cooperate with corresponding wheels of the #1 and #2 totalizers, and an extension 155 thereof, the bifurcated end of which is supported by a slotted bar 156 mounted in the framework 153, has teeth similar to those on the actuator 107 to cooperate respectively with the corresponding wheels of the #3 and #4 totalizers.

In adding operations, the wheels of the selected totalizer or totalizers are engaged with the actuators 107 or the extensions 155 after the actuators and extensions have completed their initial movement rearwardly and remain engaged therewith during return movement forwardly thereof. This rotates the wheels or the selected totalizer forwardly in proportion to the amount set up on the keyboard. After the actuators 107 and the extensions 155 complete their return movement forwardly, the wheels of the selected totalizer are moved out of engagement therewith.

In subtracting operations, the wheels of the #1 or balance totalizer are engaged with the actuators 107 prior to their initial movement rearwardly, which movement reversely rotates the wheels of the balance totalizer to subtract therefrom the amount set up on the amount keys 101. In subtract operations, the wheels of the balance totalizer are disengaged from the actuators 107 prior to the return movement forwardly by the actuators.

The well known Ellis type of transfer mechanism disclosed in Patent #1,203,863, is used to carry amounts from lower to higher denominations. The balance totalizer has a dual transfer mechanism which is shifted from adding to subtracting position in subtract operations and when a wheel of a certain order is reversely rotated through zero position, a borrow of one unit from the next higher order is effected.

In total taking or recording operations as in subtract operations, the wheels of the selected totalizer are engaged with the actuators 107 prior to the initial movement rearwardly by the actuators, and are reversely rotated thereby until stopped in zero position by contacting their corresponding add transfer pawls. This positions the actuators 107 and the amount type sectors 58 commensurate with the amount on the totalizer wheels. In total taking or recording operations, the wheels of the selected totalizer are disengaged from the actuators 107 prior to the return movement forwardly by the actuators, and consequently said wheels remain in zero position. A sub-total taking or recording operation is identical with a total taking or recording operation with the exception that the wheels of the selected totalizer remain in engagement with the actuators 107 during the return movement forwardly by the actuators, and are consequently returned to their original positions instead of being left in a cleared state.

Totalizer engaging mechanism

As the engaging mechanism is practically the same for all four totalizers, it is believed sufficient to describe the engaging mechanism for the balance totalizer only.

Referring to Figs. 10, 17 and 19, the shaft that supports the wheels of the balance or #1 totalizer is mounted in a rockable frame composed of two end plates 157, only one here shown, pivoted on studs 158 in the frame 152, and a partition plate (not shown) for each denominational order. The end plates 157 and the partition plates are connected in fixed relation by a bail 159. Each of the arms 157 carries a roller 165, which cooperates with a corresponding camming groove 166, in a cam 167, only one here shown, secured on a totalizer engaging shaft 168 journaled in the totalizer framework 152. Also secured on the shaft 168 is a crank 169 pivotally connected by a link 170 to a flying lever 171 (Fig. 17) fulcrumed at 172 to a totalizer engaging plate 173 secured on the main drive shaft 91. The flying lever 171 has pivoted thereon a pawl 174 urged counterclockwise by a spring 175 into contact with a stop stud on said flying lever 171. An upward extension of the pawl 174 cooperates with a stud 176 in a control crank 177 pivoted at 178 to the frame 51. The stud 176 is embraced by the bifurcated upper end of a pitman 179 (Figs. 17 and 18), the lower end of which is pivoted to a lever 180 loose on a stud 181 in the frame 51. Integral with the lever 180 is a shoe 182 arranged to cooperate with an arcuate surface 183 on the plate 173.

When the traveling carriage is tabulated to a columnar position, where it is desired to select the #1 totalizer for addition, a control element on said traveling carriage engages a #1 hanging bar lever and raises a #1 hanging bar 184 (Fig. 17). The lower end of the #1 hanging bar 184 is pivotally connected to a crank control latch 185 pivoted at 186 to the frame 51 and upward movement of the bar 184 rocks the latch 185 counter-clockwise out of engagement with a tooth on the lower end of the crank 177. As previously explained, the plate 173 oscillates first clockwise as viewed in Figs. 17 and 18, and then back to normal position in adding, subtracting, and total-taking operations. Initial movement clockwise of the plate 173 moves the surface 183 thereon beyond the shoe 182 to release the lever 180, the pitman 179 and the crank 177 to the action of a spring 187, which moves said crank counter-clockwise to move the pin 176 out of the path of the upper end of the pawl 174. Continued movement clockwise of the plate 173 causes the flying lever 171 to move relatively thereto until a downward extension 188 of the pawl 174 is engaged by a square stud 189 in said plate 173. This causes the flying lever 171 to move in unison with the plate 173 during the remainder of its clockwise movement, and clockwise movement of said lever 171 by means of the link 170 carries the crank 169, the shaft 168, and the cams 167 (Fig. 19) counter-clockwise. Counter-clockwise movement of the cams 167, by means of the slots 166 in cooperation with the rollers 165, rocks the #1 totalizer frame clockwise to engage the wheels of said totalizer with the teeth in the top edge of the actuators 107 after said actuators have completed their initial movement rearwardly. The #1 totalizer wheels remain in engagement with the actuators 107 during the return movement forwardly by the actuators and are rotated thereby a distance proportionate to the value of the depressed amount keys.

After the actuators 107 have completed their return movement, which movement it will be recalled is effected during return movement counter-clockwise of the shaft 91 and the plate 173, continued movement of said plate 173 causes a stud 190 (Fig. 17) carried thereby to engage a raised surface of the flying lever 171 whereupon said flying lever moves in unison with said plate 173 to rock the crank 169 and the shaft 168 clockwise to disengage the wheels of the #1 totalizer from the actuators 107 (see space E Fig. 32). Near the end of the return movement counter-clockwise of the plate 173, the arcuate surface 183 engages the shoe 182 and rocks the lever 180 clockwise, which movement, by means of the pitman 179 in cooperation with the stud 176, returns the crank 177 also clockwise so that the lower end thereof may be engaged by the latch 185.

When the traveling carriage is not tabulated to a column in which the balance or #1 totalizer is to be selected for operation, the latch 185 (Fig. 17) remains in engagement with the tooth of the crank 177. This obstructs counter-clockwise movement of the crank 177 and retains the stud 176 in the path of the upper end of the pawl 174. This causes the stud 176 to engage the pawl 174 to rock the extension 188 out of the path of the stud 189 during initial movement clockwise of the plate 173. It is therefore obvious that under these circumstances no counter-clockwise engaging movement is imparted to the crank 169 and the shaft 168, therefore, the wheels of the No. 1 totalizer are not engaged with the actuators 107.

Depressing the Non-add key 102 (Fig. 1) rocks an obstruction into the path of the crank 177 to prevent counter-clockwise movement of said crank upon downward movement of the pitman 179, which in turn prevents the #1 totalizer from being engaged with the actuators when the traveling carriage is tabulated to a #1 add position. Depressing the #1 add key 103 (Figs. 1 and 17) rocks the latch 185 counter-clockwise to ineffective position in a well known manner.

Subtract key

Calling attention to Figs. 1 and 17, depressing the Subtract key 102 moves a notch 191 therein opposite a bent-over ear 192 on an arm 193 pivoted on a stud 194 in the left frame 51. This permits a spring 195, which normally maintains the ear 192 in contact with the edge of the key 102, to urge the arm 193 clockwise. Clockwise movement of the arm 193 causes a projection on the lower end thereof, in cooperation with a stud 196 in a lever 197 pivoted on the stud 194, to rock said lever clockwise in unison therewith. Clockwise movement of the lever 197 causes a stud 198 in the lower end thereof, in cooperation with a camming surface on a total taking control lever 199 fulcrumed on a stud 200 in the frame 51, to rock said lever 199 also in a clockwise direction. Clockwise movement of the lever 199 moves the ends of spring-pulled pawls 201 and 202 into the path of a downward extension 203 of the flying lever 171, to the positions indicated by dot and dash lines in Fig. 17.

Initial movement clockwise of the plate 173 causes the projection 203 to engage the pawl 201 to rock the crank 169 and the shaft 168 counter-clockwise (see also Fig. 19) to engage the wheels of the #1 totalizer with the actuators 107 prior to the initial movement rearwardly by the actuators. Initial movement rearwardly of said actuators 107 reversely rotates the wheels of the balance totalizer to subtract therefrom the amount set up on the amount keys. After the balance totalizer has been engaged with the actuators, the end of the flying lever 171 rides off of the pawl 201 and near the end of the clockwise movement of the plate 173 the projection 203 of the flying lever 171 by-passes the pawl 202 and moves to the position indicated by dot and dash lines in Fig. 17. While the actuators 107 remain in their moved positions, return movement counter-clockwise of the plate 173 causes the projection 203 to engage the pawl 202 to rock the shaft 168 clockwise to disengage the wheels of the balance totalizer from the actuators (see space F of chart Fig. 32). After the wheels of the #1 totalizer have been disengaged from the actuators, the arm 193 (Fig. 17) is rocked counter-clockwise by the key releasing mechanism to move the ear 192 out of the notch 191 to permit the subtract key 102 to be spring-returned upwardly to undepressed position and to permit a spring 211 to return the lever 197 to normal position, whereupon the lever 199 and associated parts also return to normal position.

In Figs. 14, 15 and 16, the highest order wheel 204 of the #1 totalizer is shown with its associated add transfer pawl 205 and subtract transfer pawl 206. The pawls 205 and 206 have teeth which are arranged to cooperate with diametrically opposed teeth on a tripping cam 207 integral with the highest order wheel 204. In subtract operations the add transfer pawls are rocked out of the path of the teeth of the tripping cams 207 and the subtract transfer pawls are simultaneously rocked into the path of said teeth. In this description the wheel 204 and the highest order pawls 205 and 206 will be representative of all the totalizer wheels and all the add and subtract tripping pawls for the #1 totalizer.

Clockwise movement of the lever 197 (Fig. 17), when the Subtract key 102 is depressed, by means of a link 208 rocks a lever 209 counter-clockwise on its pivot 215, see also Fig. 9. Counter-clockwise movement of the lever 209 retracts a stud 216 in a rearward extension thereof from the bottom surface of a hook 217 pivoted on the upper end of a lever 218 secured on a transfer pawl shifting shaft 219 journaled in the totalizer framework 152. Retraction of the stud 216 permits a spring 220 to move the hook 217 downwardly into engagement with a stud 221 which pivotally connects the rearward end of the link 170 to the crank 169. Counter-clockwise engaging movement of the crank 169 and the shaft 168, after depression of the Subtract key and upon initial movement clockwise of the plate 173, causes the stud 221 to engage the hook 217 to rock the lever 218 and the shaft 219 clockwise until a square stud 210 in a downward extension of said lever 218 moves beyond a retaining notch 222 in a pawl 223 pivoted on a stud 224 in the framework 152, whereupon a torsion spring 225 urges said pawl 223 clockwise to engage the notch 222 with the stud 210 to retain the lever 218 and the shaft 219 in moved positions. This clockwise movement of the shaft 219 to the position shown in Fig. 14 causes a projection 226 on said shaft to move away from an extension 227 on the subtract pawl 206 to permit the tooth of said pawl to be spring-pulled into cooperative relationship with the tripping teeth on the cam 207. Clockwise movement of the shaft 219 also causes the projection 226 in cooperation with a camming surface on the add pawl 205 to rock said pawl counter-clockwise against the action of a spring, to move the tooth of said pawl out of cooperative relationship with the teeth of the tripping cam 207.

It is therefore obvious from the foregoing description, that the add pawls 205 remain inactive during a subtract operation and the subtract pawls 206 remain inactive during other operations of the machine.

Near the end of the return movement counter-clockwise of the engaging plate 173 (Fig. 17), a stud 228 carried thereby engages the forward end of a lever 229 pivoted on the stud 181 to rock said lever clockwise, which movement by means of a stud 230 in said lever, in cooperation with a forward extension of the pawl 223, rocks said pawl counter-clockwise to disengage the notch 222 from the stud 210 to release the lever 218 and the shaft 219 to the action of a spring 231. The spring 231 returns said lever 218 and said shaft 219 counter-clockwise to normal position, as here shown, which position is determined by the stud 210 in cooperation with a notch 232 in the pawl 223. Initial movement clockwise of the engaging plate 173 withdraws the stud 228 from the lever 229 to release the pawl 223 to the action of the spring 225 to permit the notch 222 to engage the stud 210 to retain the shaft 219 in clockwise position during subtract operations as explained above. A stud 233 in the frame 51, in cooperation with a notch in the lever 229, limits the movement of said lever.

Subtract control elements (not shown) located in predetermined columnar positions on the traveling carriage, in cooperation with the usual subtract hanging bar mechanism, will also cause the lever 197 to be rocked clockwise to condition the Balance totatlizer for a subtract operation when the traveling carriage is tabulated to a Subtract column.

*Ribbon mechanism*

When the machine is at rest, the inking ribbon 57 (Fig. 3) is lowered to a position below the printing line so that the last entry on the record material will be visible. The inking ribbon 57 is a two-color ribbon, the upper portion being black and the lower portion red (Fig. 11), and in adding operations the black portion of the ribbon is lifted to printing position so that additive items will be recorded in black. It is desirable that subtractive items be readily distinguishable from other items; consequently in subtract operations the inking ribbon 57 is raised to red printing position, and this is effected in the following manner:

The inking ribbon 57 (Figs. 3 and 11) is threaded through loops on the prongs of a lifting fork 235 supported for vertical shifting movement in a bracket (not shown) secured to the printer framework. The lower end of the fork 235 has two bent-over ears 236 with matched slots, which embrace opposite ends of a stud 237 secured in the forward end of a lever 238 pivoted at 239 to a cross frame 240 (Figs. 9, 10 and 17). A link 241 connects the rearward end of the lever 238 to one arm of a yoke 242, pivoted on trunnions 243 in the frame 240. Another arm of the yoke 242 carries a stud 244 which extends through a slot in the rearward end of a link 245, the forward end of which is pivotally connected to an arm 246 secured on the printer shaft 133.

At the beginning of machine operation, initial movement of the shaft 133 and the arm 246, by means of the link 245, rocks the yoke 242 also clockwise. In adding operations, clockwise movement of the yoke 242 is terminated by a stud 247 therein coming in contact with a hook 248 pivoted on a bracket 249 secured to the frame 240. This causes the black or upper portion of the inking ribbon 57 to be raised to printing position so that additive items will be recorded in black. A spring 260 tensioned between the link 245 and the stud 244 in the yoke 242 permits said yoke 242 to be stopped in its black printing position before the arm 246 and the link 245 reach the terminus of their initial movements.

When the #1 totalizer is conditioned for a subtract operation, counter-clockwise movement of the arm 209 (Fig. 17) moves a link 261, the lower end of which is pivoted to said arm 209 and the upper end of which is slotted to receive a stud 250 in a link 251, to lower a hook 252 on the forward end of said link into the path of a square stud 253 carried by the #1 totalizer engaging link 170. A spring 254 forms a flexible connection between the links 251 and 261, and normally maintains the stud 250 in the bottom of the slot in the link 261. The rearward end of the link 251 is pivoted at 255 to the left arm of a yoke 256 rotatable on a shaft 257 journaled in the cross frame 240.

Initial movement forwardly of the link 170 at the beginning of a subtract operation causes the stud 253, when the link 251 has been lowered, to engage the hook 252 to shift the link 251 forwardly to rock the yoke 256 counter-clockwise as viewed in Fig. 17 and clockwise as viewed in Figs. 11 and 13. The righthand arm of the yoke 256 carries a bushing 258, which forms a bearing on the shaft 257, and said bushing has secured thereon an arm 259 carrying a stud 265 which cooperates with a slot 266 in the hook 248. Clockwise movement of the yoke 256 and the arm 259, by means of the stud 265, rocks the hook 248 counter-clockwise out of the path of the stud 247, whereupon initial movement clockwise of the shaft 133 and the arm 246, by means of the mechanism shown in Fig. 11, raises the red portion of the inking ribbon 57 to printing position so that subtractive items will be printed in a distinctive color.

An upward extension 267 (Figs. 12 and 13) of the right arm of the yoke 256, in cooperation with a stud 268 in a bar 269 slidably supported in a slot in the frame 240, shifts said bar 269 rearwardly when the yoke 256 is rocked clockwise, in the manner explained above. The bar 269 carries a stud 270, which extends through a slot in a pawl 271, urged rearwardly and clockwise by a spring 272 to normally maintain an ear 273 on said pawl in contact with the bottom of a notch in the bar 269. Initial movement clockwise of the printer shaft 133 and the arm 246 causes a stud 274 in said arm, in cooperation with the slotted lower end of an arm 275 pivoted at 276 to the printer framework, to rock said arm 275 also clockwise to cause the upper end of said arm to by-pass the pawl 271, which was moved to the position indicated by dot and dash lines in Fig. 12 when the yoke 256 was rocked to red printing position. Return movement counter-clockwise of the arms 246 and 275 causes said arm 275, in cooperation with the pawl 271, to return the bar 269 forwardly, which by means of the stud 268 restores the yoke 256 (Figs. 11 and 13), the crank 259 and the hook 248 to black printing position as here shown. An angular tooth 262 of a spring pulled pawl 263 pivotally connected to a downward extension of the right arm of the yoke 256, in cooperation with a shaft 264 journaled in the frame 240 (Fig. 9), retains the yoke 256 in either of its two positions.

When the Subtract key 102 (Fig. 17) is restored to undepressed position by rocking the ear 192 of the arm 193 out of the notch 191, the spring 211 returns the lever 197 counter-clockwise to normal position, as here shown, to return the link 251 upwardly out of the path of the stud 253.

*Balance operations*

Balance operations or total taking operations from the #1 totalizer are similar to subtract operations with the exception that all inadvertently depressed amount keys are automatically released at the beginning of said balance operation, and the transfer mechanism remains in adding position.

Depressing the Balance key 102 (Figs. 1 and 17) moves a notch 278 therein opposite a bent-over ear 279 on an arm 280 pivoted at 281 to the left frame 51. This frees the arm 280 to the action of a spring 282, which urges said arm clockwise to engage the ear 279 with the notch to retain the Balance key in depressed position and to cause a downward projection on the arm 280, in cooperation with a stud 283 in a lever 284 pivoted on the stud 281, to rock said lever 284 also clockwise. Clockwise movement of the lever 284, by means of a stud 285 in the lower end thereof in cooperation with a camming surface on a total control lever 286 pivoted on the stud 200, rocks said lever 286 also in a clockwise direction. Clockwise movement of the lever 286 by means of a forward projection thereof in cooperation with a stud 287 in the lever 199, rocks said lever 199 clockwise in unison therewith to move the pawls 201 and 202 upwardly into the path of the projection 203 of the flying lever 171.

As in subtract operations, initial movement clockwise of the engaging plate 173 causes the end of the flying lever 171 to engage the pawl 201 to cause shaft 168 to be rocked (see also Fig. 19 and space H Fig. 32) counter-clockwise to engage the wheels of the Balance totalizer with the actuators 107 prior to their initial movement rearwardly. Initial movement of the actuators 107 revolves the wheels 204 of the Balance totalizer reversely or in a clockwise direction, as viewed in Figs. 14 and 16—A, until said wheels are stopped in zero position by one of the diametrically opposed teeth on the tripping cams 207 engaging the add tripping pawls 205. This, as formerly explained, positions the actuators and the type carriers commensurate with the amount on the #1 totalizer wheels 204, and while the actuators 107 remain in their moved positions, return movement counter-clockwise of the plate 173 (Fig. 17) causes the projection 203 of the flying lever 171 to engage the pawl 202 to cause the totalizer wheels to be disengaged from the actuators. The return movement forwardly of the actuators 107 will have no effect on the Balance totalizer wheels, and said wheels will remain in zero position. Near the end of a Balance operation, the arm 280 is rocked counter-clockwise in the well-known manner to release the Balance key 102 so that it may be spring-returned upwardly to undepressed position, and counter-clockwise movement of said arm 280 permits a spring 288 to return the lever 284 counter-clockwise in unison with said arm to permit the pawls 201 and 202 to move downwardly out of the path of the projection 203 of the flying lever.

Depressing the Sub-total key 102 in conjunction with the Balance key causes the arm 280 to be rocked counter-clockwise to release the Balance key immediately after the actuators have completed their initial movement rearwardly (see space G Fig. 32). This permits the pawl 202 to drop downwardly out of the path of the projection 203 to cause the totalizer wheels to remain in engagement with the actuators 107 during the return movement forwardly by the actuators, so that said wheels will be returned to their original positions. After the actuators 107 have completed their return movement, the stud 190 on the plate 173 engages the flying lever 171 to disengage the wheels of the Balance totalizer from the actuators.

Non-add key

There is a crank similar to the crank 177 (Fig. 17) for each of the four totalizers, and, as before stated, depressing the Non-add key 102 (Fig. 1) rocks an obstruction into the path of the lower end of these cranks to prevent counter-clockwise movement thereof, irrespective of whether an Add key has been depressed or the traveling carriage tabulated to an Add column. This prevents engagement of any of the four totalizers with the actuators 107 and is appropriately called a Non-add operation. Such an operation is performed when it is desired to use the amount keys for printing various data, including department number, lock number, folio number, etc., without entering the values in the totalizers.

Amount key releasing mechanism

Mechanism now to be described is provided for automatically releasing the amount keys near the end of adding and subtracting operations and for automatically releasing any amount keys accidentally or inadvertently depressed prior to a total or sub-total operation. This mechanism that releases the amount keys also moves the zero latches out of engagement with the actuators at the beginning of total and sub-total taking operations. Manual means is also provided for releasing the depressed amount keys.

Referring to Figs. 10, 17 and 20, the Release key 102 has pivotally connected thereto one end of a link 289, the other end of which is bifurcated to straddle a stud 290 in a bar 291 slidably mounted by means of slots therein in cooperation with stationary studs in the frame 51. Depressing the release key 102 shifts the bar 291 rearwardly, causing a stud 292 in an upward extension thereof, in cooperation with an inverted V slot in a crank 293 fast on a shaft 294 journaled in the keyboard framework, to rock said crank and said shaft clockwise, as viewed in Fig. 20 and counter-clockwise, as viewed in Fig. 10. Secured on the shaft 294 is an arm 295, carrying a stud 296, which in cooperation with angular camming surfaces on projections 297 and 298 of the detent 116 and the control plate 119, shifts said detent and said control plate rearwardly and forwardly respectively against the action of the spring 118, when said crank 295 rocks in unison with the shaft 294. Rearward movement of the detent 116 (Fig. 10) disengages one of the hooks therein from the pin 115 of the depressed amount key 101 to permit said amount key to be spring-returned upwardly to undepressed position. The shifting of the control plate 119 is incidental in this particular case, and is useful only in total and sub-total recording operation when such movement is used to disengage the zero latches from the amount actuators 107 when no amount keys are depressed.

Pivoted on a stud 299 in the slide 291 (Fig. 20) is a pawl 300 urged counter-clockwise by a torsion spring 301 to normally maintain a flat surface on a hook thereof in resilient engagement with a roller 302 on a disk 303 secured on the main shaft 91. Initial movement clockwise of the shaft 91 and the disk 301 causes the roller 302 to move beyond the hook on the pawl 300, whereupon the spring 301 immediately urges said pawl counter-clockwise to move the hook into the path of said roller 302. Return movement counter-clockwise of the disk 303 causes the roller 302 to engage the hook to shift the pawl 300 and the slide 291 rearwardly to release the depressed amount keys in the manner explained above. Before the disk 303 completes its return movement counter-clockwise, an upward projection of the pawl 300 engages a stationary stud 304, which disengages the hook of said pawl from the roller 302 and permits return of the bar 291 by a spring 311.

The mechanism described above automatically releases the depressed amount keys in non-adding, adding and subtracting operations. In total and sub-total recording operations it is necessary that the automatic amount key releasing mechanism function in the early part of an operation in order to release any amount keys inadvertently depressed prior to said total or sub-total recording operation. In this case the functioning of the release mechanism is also used to shift the control plates 119 forwardly in the beginning of sub-total and total recording operations to release the zero latches for the amount actuators 107.

Directing attention to Figs. 17 and 20, a latch 305 for the #2 add key 102 is pivoted on a stationary stud 306 and has pivotally connected to the lower end thereof a lever 307 spring-urged upwardly or clockwise to cause a stud 308 in a downward extension thereof, in cooperation with a tail of a key release pawl 309 pivoted at 315 on a downward extension of the bar 291, to restrain said pawl 309 against the influence of the torsion spring 301 to normally maintain a notch 316 in the rearward end of said pawl out of engagement with a roller 317 mounted on the lower end of a lever 318 pivoted at 319 to the left frame 51. The lever 318 has a camming surface 320 urged into cooperation with a roller 321, carried by the disk 303, by a spring 322.

Depressing the Balance key 102 (Fig. 17) causes the stud 285 in the lever 284 to rock the total control lever 286 downwardly or clockwise to engage a stud 323 in the downward extension of the lever 307 to rock said lever 307 downwardly or counter-clockwise against the action of the spring 310.

Counter-clockwise movement of the lever 307 (Fig. 20) withdraws the stud 308 from the tail of the pawl 309 to permit the spring 301 to rock the pawl 309 clockwise to engage the notch 316 with the roller 317. Initial movement clockwise of the main shaft 91 and the disk 303 causes the roller 321, in cooperation with a lobe on the camming surface 320, to immediately rock the lever 318 clockwise to shift the bar 291 rearwardly to rock the crank 295 and the stud 296 downwardly to shift the locking detent 116 rearwardly and the control plate 119 forwardly (see also Fig. 10). Rearward movement of the detent 116 releases any depressed amount key, prior to initial movement rearwardly of the actuator 107 and forward movement of the control plate 119 rocks the latch 120 counter-clockwise out of engagement with the block 122 to free the actuator 107 so that it may be positioned by its corresponding wheel on the Balance totalizer.

After the bar 291 (Fig. 20) has been moved rearwardly sufficiently to release the depressed amount keys and to move the zero latches to ineffective positions, continued movement clockwise of the disk 303 causes a roller 324 thereon, in cooperation with a camming surface 325 on the pawl 309, to rock said pawl counter-clockwise out of engagement with the roller 317 to permit the bar 291 and connected parts to be returned to normal position by the spring 311, as here shown. When the lever 284 (Fig. 17) is returned by the spring 288 counter-clockwise upon release of the Balance key, the lever 286 returns upwardly to normal position to permit the lever 307 to be returned clockwise or upwardly by the spring 310 to cause the stud 308 to again engage the tail of the pawl 309 to retain the notch 316 out of engagement with the roller 317.

The #2, #3 and #4 total keys 102 (Fig. 1) also control the lever 307 (Fig. 20) in exactly the same manner as the Balance key.

Depressing the #2 add key 102 (Fig. 20) moves a notch 326 therein opposite a bent-over ear on the latch 305 to permit a spring 327 to urge said latch clockwise to shift the lever 307 rearwardly. This moves a curved rearward extension 328 of the lever 307 nearer to the roller 302 but ordinarily the roller 302 passes under the extension 328 and therefore does not move the lever 307. Depressing any of the total keys rocks the lever 307 downwardly in the manner explained above, to move the extension 328 into the path of the roller 302, whereupon initial movement clockwise of the disk 303 causes the roller to engage the extension to shift the lever 307 forwardly to disengage the ear of the latch 305 from the notch 326 to permit the #2 add key to be spring-returned to undepressed position. The reason for this is that total operations have precedence over adding operations. Rearward movement of the lever 307, when the #2 add key is depressed (Fig. 20), causes a stud 329 in said lever to move under a projection 330 of the pawl 300 to retain said pawl upwardly out of engagement with the roller 302. This in effect makes a repeat key out of the #2 add key and prevents the functioning of the key releasing mechanism and consequently the amount key and the #2 add keys remain depressed at the end of machine operation. The #2 add key and the amount keys may be released by depressing the Release key 102.

*Overdraft mechanism*

Where merchandise is sold on the installment plan or where charge accounts are carried by business establishments, one of the systems of bookkeeping employed is to add the charge items together and treat the total of these items as a debit balance. Payments made on account by customers are treated as credits, and these credits are subtracted from the debit balance. It often happens that a customer makes sufficient payments to overcome his debit balance and create a credit balance, or he may in some cases return a quantity of merchandise for credit and in this way create a credit balance. When a credit balance is established during a series of operations, it means that the Balance totalizer is in an overdrawn condition and contains the complementary amount of the credit balance. The operator is notified of this fact, when an attempt is made to take a balance, by the locking of the Balance key against depression.

In former machines of this type it was possible, in an automatic overdraft operation, to transpose the complementary amount of an overdraft to a true negative balance and record said true negative balance. See application of Charles L. Lee, Serial No. 605,160, which was filed April 14, 1932 and which was issued on May 4, 1937, as Patent No. 2,079,355. Furthermore, in a later machine disclosed in application of Paul H. Williams et al., Serial No. 104,650, which was filed October 8, 1936, it was possible to preserve the true negative balance in the Balance totalizer so that any desired number of repeat prints could be obtained thereof. However, the present invention goes a step further and provides selective means whereby, in one continuous operation of the machine, the complement of an overdraft may be transposed to a true negative balance, said true negative balance printed, and the Balance totalizer left in a zeroized condition; or if desired, the complement of the overdraft may be reentered in the Balance totalizer in preparation for further computations.

The sub-credit balance and credit balance features are controlled by a Sub-credit balance key 331 and a Credit balance key 332, which in some adaptations are appropriately termed, respectively, Sub-overdraft and Overdraft keys. Depressing the Sub-credit balance key causes the machine to operate automatically through four machine cycles to transpose the complementary amount of an overdraft to a true negative balance and record same. Depressing the Credit balance key causes the Balance totalizer to remain zeroized at the end of the operation and depressing the Sub-credit balance key causes the complementary amount of the overdraft to be reentered in the Balance totalizer.

A storage or stop device is used in conjunction with the Balance totalizer in transposing the complementary overdraft to a true negative balance and back to a complementary overdraft. In sub-credit and credit balance operations the engaging of the storage device and Balance totalizer with the actuators and the disengaging of said storage device and totalizer from said actuators is controlled automatically. Following is a list of happenings in the different cycles of sub-credit and credit balance operations, it being understood that when the Balance totalizer is overdrawn it contains the complementary amount of the credit balance or overdraft.

SUB-CREDIT BALANCE OPERATIONS

*Cycle 1.*—Clear complementary amount of overdraft from Balance totalizer and add said complement in the storage device.

*Cycle 2.*—Clear complementary amount of overdraft from the storage device and simultaneously subtract said complement from the zeroized Balance totalizer. The Balance totalizer now contains the true negative balance.

*Cycle 3.*—Clear true negative balance from the Balance totalizer and enter said true negative balance in the storage device.

*Cycle 4.*—Clear true negative balance from the storage device, print the true negative balance, and simultaneously subtract said true negative balance from the zeroized Balance totalizer. The Balance totalizer now contains the complementary amount of the overdraft and amounts may be added to or subtracted from this complement.

CREDIT BALANCE OPERATIONS

Cycles 1, 2 and 3 are exactly the same as in sub-credit balance operations.

*Cycle 4.*—The true negative balance is cleared from the storage device and printed. In this case the true negative balance is not subtracted from the zeroized balance totalizer; consequently said totalizer remains cleared.

The mechanism described in general above will now be described in detail.

Credit balance and sub-credit balance keys

Referring to Figs. 9, 22, 24, 25 and 26, the reduced upper end of the stem of the Credit Balance key 332 extends through an opening in the bracket 76, while the bifurcated lower end of said stem straddles a stud 333 in the right frame 50, and a slot in the key 332, parallel to the bifurcated lower end thereof, cooperates with a stud 334 fast in the frame 50. A spring 335 urges the key 332 upwardly to normally maintain a shoulder, formed by the reduced upper end of said stem, in contact with the lower surface of the bracket 76.

The Sub-credit balance key 331 is mounted on the Credit balance key 332 by means of parallel slots in the stem of said key 331, in cooperation with studs 336 and 337 carried by the key 332, and the lower end of the stem of said key 331 is bifurcated to embrace the stud 333. A reduced portion of the upper end of the stem of said key 331 protrudes through a slot in the bracket 76, and a spring 338 urges said key 331 upwardly to normally maintain a shoulder, formed by the reduced upper end thereof, in contact with the lower surface of the bracket 76.

By studying Figs. 4 and 7, it will be seen that when both the keys 331 and 332 are undepressed, the studs 336 and 337 in the key 332 engage the top ends of the parallel slots in the stem of the key 331. It is therefore obvious that the key 331 cannot be depressed without carrying the key 332 downwardly in unison therewith, but the Credit balance key 332 may be depressed without operating the Sub-credit balance key 331.

A plate 339 (Figs. 22, 25 and 26) has a slot in the lower end thereof which embraces the stud 333, and said plate carries a stud 340 which extends through a slot in the stem of the key 332 and has pivoted thereon a latch 341 urged counter-clockwise by a spring 342 to normally maintain a bent-over ear 343 thereof in engagement with a notch in the stem of the key 332. A stud 344 is mounted on the plate 339 and the tenon of said stud extends through said plate and has secured thereon a collar 345 of about the same diameter as said stud 344.

Depressing the key 332 causes the latch 341 to carry the plate 339 downwardly in unison therewith to cause the stud 344 (Figs. 25 and 26) to engage a forward projection of a latch 346 pivoted on the stud 333 and rock said latch counter-clockwise against the action of a spring 347. Counter-clockwise movement of the latch 346 disengages a hook thereof from a bent-over ear 348 on a lever 349 loose on the shaft 70. The lever 349 is connected by a link 350 to a crank 351 secured on a shaft 352 (see also Fig. 9) journaled in the frames 50 and 51. When the latch 346 is thus disengaged from the lever 349 a spring 353, one end of which is connected to the crank 351 and the other end to a stud in the frame 50, rocks said crank, the shaft 352 and, by means of the link 350, the lever 349 clockwise until a roller 354 carried by said lever 349 engages the periphery of a control cam 355. The cam 355 is one of an integral cluster or assembly of control cams (Fig. 29) mounted on a sleeve 356 loose on the stud 73. Clockwise movement of the shaft 352 selects the Balance totalizer for a total operation, in a manner to be described later.

Referring to Figs. 4, 24 and 25, downward movement of the plate 339, when the Credit balance key 332 is depressed, causes the collar 345, in cooperation with a projection of a latch 357, to rock said latch counter-clockwise against the action of a spring 360 to disengage the hook on the lower end of said latch from a bent-over ear 358 on a lever 359 loose on the shaft 70. This releases the lever 359 to the action of a spring 365, which immediately rocks said lever clockwise until a roller 366 carried thereby engages the periphery of a plate cam 367 which is one of the assembly of cams shown in Fig. 29, mounted on the sleeve 356. Clockwise movement of the lever 359 by means of a link 368, the rearward end of which is pivoted to said lever and the forward end of which is slotted to receive a stud 369 in the lever 80, rocks said lever 80 counter-clockwise, which in turn rocks the lever 82 and the arm 72 clockwise to disengage the stud 71 from the shoulder of the plate 69 to start the machine operating in the manner explained earlier herein.

As previously explained, the cam surface 92 on the crank 88, in cooperation with the roller 93, rocks the lever 65 clockwise near the end of each cycle of operation to restore the plate 69 clockwise so that the shoulder thereon may be reengaged by the stud 71. However, as an overdraft operation consists of four machine cycles, it is necessary to prevent the stud 71 from reengaging the shoulder on the plate 69 to insure continuous operation of the machine. Clockwise movement of the lever 359 retracts a surface on said lever from a stud 369 carried by a latch 370 fulcrumed on the stud 107. This releases the latch 370 to the action of a spring 371, which engages a hook 372 of said latch with the stud 71 when said stud is rocked clockwise out of engagement with the shoulder on the plate 69.

Clockwise movement of the lever 359 (Fig. 24) under influence of the spring 365, by means of a stud 373 in said lever, in cooperation with a slot in the forward end of a link 374, the rearward end of which is pivoted at 375 to the link 111, shifts said link 111 counter-clockwise out of engagement with the stud 110 in the arm 90 and into engagement with a stationary stud 376 in the right frame 50. This disables the printer shaft 133 during the first three machine cycles of an overdraft operation to prevent unnecessary and erroneous entries from being made on the record material. Near the end of the third machine cycle of an overdraft operation the lever 359 is restored counter-clockwise by the cam 367, which is rotated in a manner presently to be described, and reengaged by the latch 357. This restoration of the lever 359 tensions a spring 377 stretched between said lever and the link 374, and when the stud 110 moves into alinement with the notch in the link 111, at the end of the third machine cycle, said spring 377 urges said link 111 into engagement with said stud so that the printer mechanism will function during the fourth machine cycle of an overdraft operation to print the true negative balance.

Restoration counter-clockwise of the lever 359 (Fig. 4), in cooperation with the stud 369, disengages the latch 370 from the stud 71. However, this disengaging of the latch 370 occurs after the cam surface 92 on the crank 88 has acted on the plate 69, and consequently the stud 71 does not become effective until the fourth machine cycle and therefore does not interfere with the full four cycles of movement of the machine operating mechanism during overdraft operations.

*Operating mechanism for overdraft control cams*

Depressing the Credit balance key 332 (Figs. 7 and 8) causes the stud 337 therein, in cooperation with a substantially horizontal slot in an arm 378 pivoted on a crank 379 secured to the shaft 91, to latch a notch 380 in said arm over a stud 381 in a slide 382 mounted to slide horizontally by means of parallel slots therein, in cooperation with the shaft 91 and the stud 73. The slide 382 is held against lateral displacement by means of collars on the shaft 91 and stud 73 and by means of a plate 364 (Figs. 3 and 9) having holes therein which fit over the ends of the shafts 70 and 91 and the stud 73 and retained in position by means of screws in the end of the shaft 91 and the stud 73. The arm 378 operatively connects the slide 382 to the shaft 91 and consequently said slide is reciprocated back and forth first forwardly and then rearwardly during each machine cycle of an overdraft operation, or four complete reciprocations or excursions during an overdraft operation.

Pivoted on the slide 382 (Figs. 7 and 8) are pawls 383 and 384 having studs therein which protrude through clearance holes in said slide 382 and having stretched therebetween a spring 385 which urges said pawls 383 and 384 toward each other. The spring 385 urges a tooth of the pawl 383 into cooperative relationship with four wedge shaped notches 386 in a control cam feed ratchet 387 and said spring 385 urges a tooth of the pawl 384 into communication with four teeth 388 of a control cam ratchet 389. The ratchets 387 and 389 are separated by a disk 390 and said ratchets, together with the cams 355 and 367 (Fig. 29) and a storage device engaging cam 391, are coupled in an integral unit on the sleeve 356 by means of several rivets which pass through all the cams and the ratchets and a flange formed on the sleeve 356, which flange separates the cam 355 from the cam 391.

Initial movement forwardly of the slide 382 causes the tooth of the pawl 383 to engage one of the wedge shaped notches 386 and revolves the sleeve 356 and the parts assembled thereon counter-clockwise approximately sixty degrees of movement. Return movement rearwardly of the slide 382 causes the tooth of the pawl 384 to engage one of the teeth 388 in the ratchet 389 and revolves the parts mounted on the sleeve 356 approximately thirty degrees of movement. As the sleeve 356 and the parts assembled thereon are revolved ninety degrees in one machine cycle, the push-pull effect of the pawls 383 and 384 will revolve this assembly one complete revolution in four machine cycles. A spring-pulled pawl 392 (Fig. 8) loose on the shaft 70, in cooperation with the teeth of the ratchet 387, prevents retrograde movement of the cam assembly during rotation thereof.

The wedge shaped notches in the ratchet 387, in cooperation with the tooth of the pawl 383, prevent the cam assembly from running ahead of said pawl 383 when the declining surfaces on the cams are opposite the rollers of the spring-pulled cam levers 349 and 359 (Figs. 24 and 26). A downwardly projecting tooth 393 (Fig. 8) on the pawl 383, in cooperation with the periphery of the ratchet 387, causes the feeding tooth of said pawl 383 to ride out of the notch 386 at the end of the feeding movement so that said pawl will not interfere with the feeding movement of the pawl 384 upon return movement of the slide 382.

The Credit balance key 332 (Fig. 4) remains depressed until near the end of the fourth machine cycle of an overdraft operation, whereupon said key is released and is restored upwardly by the spring 335. Restoration of the Credit balance key 332 disengages the notch in the arm 378 from the stud 381 to prevent operation of the slide 382 in other than overdraft or credit balance and sub-credit balance operations. In order to insure that the slide 382 (Fig. 7) is fully returned rearwardly, even though the notch 380 is disengaged from the stud 381, the forward wall of said notch 380 forms a downwardly projecting finger which remains in the path of the stud 381 and insures return of the slide 382 to normal position.

*Retaining means for credit balance and sub-credit balance keys*

Referring to Figs. 24, 25 and 26, the Sub-credit balance key 331 and the Credit balance key 332 have respectively, inverted locking lugs 394 and 395, which cooperate with a locking pawl 396 pivoted on a stud 397 in the frame 50, and urged counter-clockwise to locking position by a spring 398.

Depressing either of the keys 331 or 332 moves the lug 394 or 395 thereof below a locking surface 399 of the pawl 396, whereupon the spring 398 moves said surface 399 above the lug 394 or 395 to lock the depressed key against return movement upward under influence of the spring 335 or 338. When the Credit balance key 332 alone is depressed, a surface 400 on the pawl 396 moves under the lug 394 to lock the Sub-credit balance key 331 against depression. The pawl 396 has a shoulder 401 which cooperates with a stud 402 in a pawl 403 (Fig. 28) loose on the pivot 112 between the link 111 and the arm 113 and urged clockwise and normally maintained in contact with a stop stud 404 by a spring 405.

During the first three machine cycles of an overdraft operation, when the link 111 is disconnected from the arm 90 as explained above, the pawl 403 remains stationary and the latch 396 consequently remains effective to retain the depressed Credit balance or Sub-credit balance keys against restoration. It will be recalled that at the end of the third machine cycle in an overdraft operation the link 111 is reengaged with the stud 110 and, during the first part of the fourth machine cycle in said operation, upward movement of the link 111 causes the stud 402 to bypass the shoulder 401 and during the last part of said fourth cycle return movement downwardly of the link 111 causes the stud 402 to engage the shoulder 401 to disengage the surface 399 from the depressed key to permit said key to be spring-returned to undepressed position.

Means is provided to hold the latch 396 in released position in case either of the keys 331 or 332 is accidentally retained depressed. Pivotally mounted on the stationary stud 334 (Figs. 24, 26 and 31) is a pawl 406 urged clockwise by the spring 398, which is stretched between the pawl 396 and said pawl 406, to normally maintain a tooth on the upper end of said pawl 406 in contact with the top surface of a shoulder 407 on the pawl 396. When the stud 402 in the pawl 403, in cooperation with the shoulder 401, rocks the pawl 396 clockwise to disengaged position the shoulder 407 on said pawl moves beyond the end of the pawl 406, which immediately drops behind said shoulder and obstructs return movement counter-clockwise of the pawl 396 under influence of the spring 398, when the stud 402 rides off the shoulder 401 near the end of the fourth machine cycle, until the keys 331 and 332 are fully returned to undepressed positions.

In returning to undepressed position, a stud 408 in the stem of the key 332 engages an inclined surface on a downward extension of the pawl 406 and rocks said pawl counter-clockwise to disengage the upper end thereof from the shoulder 407 to permit the pawl 396 to resiliently engage the lugs 394 and 395. As depressing the Sub-credit balance key 331 also depresses the Credit balance key 332, it can readily be seen that the release of the latch or pawl 406 by the key 332 is all that is necessary.

Means is provided to prevent the machine from operating unless the Sub-credit balance key 331 or the Credit balance key 332 is fully depressed and latched in depressed position. Clockwise movement of the lever 359 (Fig. 24), when the latch 357 is disengaged therefrom, shifts the link 374 rearwardly causing the stud 375 forming the pivot between said link 374 and the link 111, in cooperation with a curved slot in the upper end of a bar 409, the lower end of which is pivotally connected to the lever 65, to shift the upper end of said bar 409 under a stud 415 in a plate 416 integral with the latch 396. The stud 415, in cooperation with the bar 409, prevents counter-clockwise releasing movement of the lever 65 (see also Fig. 4) until a key 331 or 332 is fully depressed and the pawl 396 has moved counter-clockwise to latch said key in depressed position. This counter-clockwise movement of the pawl 396 rocks the plate 416 in unison therewith to withdraw the stud 415 from the upper end of the bar 409 to permit counter-clockwise releasing movement of the lever 65. The arrangement of the parts permits the lever 359 to shift the bar 409 to effective position before the link 368 (Fig. 4), in cooperation with connected parts, rocks the stud 71 out of engagement with the shoulder on the releasing plate 69.

*Totalizer controlling mechanism*

As previously explained, depressing the Credit balance key 332 (Fig. 26) rocks the pawl 346 out of engagement with the lever 349, permitting said lever and the shaft 352 to rock clockwise, as here viewed, and counter-clockwise as viewed in Fig. 17. Secured on the shaft 352 is a lever 417 which rocks in unison therewith, causing a camming surface 418 on the upper end thereof, in cooperation with a stud 419 in the lever 284, to rock said lever and the lever 286 clockwise to move the pawls 201 and 202 into the path of the flying lever 171 to select and condition the Balance totalizer for a total recording or zeroizing operation. Intergral with the arm 417 is a finger 420 arranged to cooperate with a stud 421 in the lever 197 to condition the Balance totalizer for a subtract operation in a manner presently to be described. However, in the beginning of the first cycle of credit balance operations the periphery of the cam 355 (Fig. 26), in cooperation with the roller 354 and associated parts, limits the movement of the finger 420 so that it does not engage the stud 421.

The zero latches 120 (Fig. 10) are rocked to ineffective position in credit balance and sub-credit balance operations in the following manner:

Clockwise movement of the lever 286, in cooperation with the stud 323, rocks the lever 307 (Fig. 20) counter-clockwise or downwardly to retract the stud 308 from the tail of the pawl 309 to permit the notch 316 in said pawl to engage the roller 317. Initial movement clockwise of the disk 303 rocks the lever 318 to shift the bar 291 rearwardly to rock the shaft 294 and the arms 295 to shift the control plates 119 forwardly to release the zero latches 120 so that the actuators 107 are free to move under control of the leading frame 129. This mechanism is effective to control the zero latches during all four cycles of a sub-credit balance operation and during the first three cycles of a credit balance operation.

Of course it is necessary to move the latches 120 to ineffective position in the fourth machine cycle of a credit balance operation and the means for accomplishing this result will be explained later.

During a total operation, the actuators 107 (Fig. 10) in their initial movement rearwardly, reversely rotate the wheels of the Balance totalizer to zero and said actuators are positioned under control of said wheels commensurate with the values of the amount thereon. After the actuators 107 have thus been positioned, a high portion 422 of the cam 391 (Figs. 9, 22 and space J Fig. 32) engages a roller 423 on an arm 424 secured on the shaft 70, and rocks said arm and said shaft counter-clockwise. Arms 425 and 426 (Figs. 9 and 23) secured on the shaft 70, move counter-clockwise in unison therewith, causing identical camming slots 427 in said arms, in cooperation with rollers 428 mounted on two side arms, pivoted on the bar 108, of a rockable frame 429 which supports the wheels 430 of the storage device, to rock said frame 429 counter-clockwise. There is a wheel 430 (Fig. 10) for each of the actuators 107 and counter-clockwise movement of the frame 429 engages said wheels 430 with the teeth of racks 431 one of which is secured on each of the corresponding actuators 107. Counter-clockwise movement of the arm 425 (Figs. 10 and 23) causes said arm to engage a stud 432 in a storage device aliner 433 pivotally mounted in the frame 429 and rocks said aliner 433 out of engagement with the teeth of the storage wheels 430, after said wheels have been engaged with their respective racks 431. The aliner 433 is normally spring-retained in engagement with the teeth of the storage wheels 430. Return movement forwardly of the actuators 107 rotates the wheels 430 of the storage device, which were standing in zero position, counter-clockwise to enter in said wheels the complementary amount of the overdraft or the credit balance standing on the Balance totalizer wheels.

At the end of the first machine cycle, a low surface 434 on the cam 355 (Fig. 26 and space L of chart Fig. 32), in cooperation with the roller 354, permits the spring 353 to rock the shaft 352 an additional distance clockwise to cause the finger 420 (Fig. 17) to engage the stud 421 to rock the lever 197 clockwise to condition the Balance totalizer for a subtract operation in the manner explained earlier herein. The high portion 422 (Fig. 22) of the cam 391 retains the storage wheels in engagement with the actuators 107 during the initial movement rearwardly of said actuators in the second machine cycle in this operation.

Initial movement rearwardly of the actuators 107 during the second machine cycle in this operation, rotates the storage wheels 430 clockwise until a wide tooth on each of said wheels, in cooperation with a stop on the frame 429, stops said wheels in zero position and positions the actuators 107 to the complementary amount of the overdraft or credit balance, which was cleared from the Balance totalizer in the first cycle of operation. The wheels of the Balance totalizer, which are now standing in the zero position, are engaged with the actuators 107 in subtract time and are reversely rotated by initial movement of the actuators to subtract the complementary amount of the credit balance from the zero values on said wheels, which leaves the true negative credit balance on said wheels.

Prior to return movement forwardly of the actuators 107 in the second machine cycle in this operation, the high surface 422 of the cam 391 (Fig. 22 and space J Fig. 32) moves beyond the roller 423, permitting a spring 435 (Fig. 23), one end of which is connected to a crank secured on the shaft 70, to rock said shaft and the arms 425 and 426 clockwise to disengage the wheels of the storage device from the racks 431 on the actuators 107. The stops 462 (Fig. 33) which cooperate with the wide teeth of the storage wheels 430 are positive when said wheels are rotated in a clockwise direction, and flexible when said wheels are rotated in a counter-clockwise direction. This prevents breakage in case said wheels are ever accidentally rotated counter-clockwise through zero position. At the end of the second machine cycle in this operation, the periphery of the cam 355 (Fig. 26 and space L Fig. 32), in cooperation with the roller 354, rocks the shaft 352 counter-clockwise to move the finger 420 (Fig. 17) out of engagement with the stud 421. However, the surface 418, in cooperation with the stud 419, still selects the Balance totalizer for a total-taking operation.

In the third machine cycle in this operation, initial movement rearwardly of the actuators 107 clears the true negative credit balance from the wheels of the Balance totalizer and, while said actuators dwell in their rearward positions, another large diametrical portion 436 of the cam 391 (Fig. 22 and space J Fig. 32) in cooperation with the roller 423, rocks the wheels of the storage device into engagement with their corresponding racks 431 on the actuators 107. Return movement forwardly of the actuators 107 enters the true negative credit balance into the wheels of the storage device.

During the first machine cycle in this operation, the surface 436 of the cam 391 (Fig. 22) engages a bent-over ear 437 of the latch 341 to rock said latch clockwise out of engagement with the notch in the plate 339 to release said plate to the action of the spring 342, which immediately restores said plate upwardly independently of the Credit balance key 332. This frees the pawl 346 and when at the end of the third machine cycle of operation a node 438 on the cam 355 (space L Fig. 32) engages the roller 354 and rocks the lever 349 and the shaft 352 counter-clockwise to normal position, the ear 348 of said lever 349 is engaged by the latch 346 and retained in normal position. This return of the shaft 352 to normal position moves the surface 418 (Fig. 17) of the lever 417 out of engagement with the stud 419 to permit the levers 284 and 286 to be returned to ineffective positions, as here shown. It is therefore evident that in the fourth machine cycle of credit balance operations the Balance totalizer, which was left standing at zero in the third machine cycle in this operation, will not be engaged with the actuators 107. This restoration of the lever 286 permits the lever 307 (Fig. 20) to be returned upwardly by the spring 310 to disengage the notch 316 in the pawl 309 from the roller 317. However, in the fourth machine cycle of a Credit balance operation it is necessary that the zero latches 120 be released so that the actuators 107 may be positioned by the wheels of the storage device and in turn position the printing sectors to the true negative balance, so that said true negative balance may be recorded. This is accomplished as follows:

Referring to Fig. 22, in the third machine cycle of a credit balance operation the raised portion 436 of the cam 391 engages the roller 423 to rock the shaft 70 and the arms 425 and 426 counter-clockwise, as viewed in Figs. 9, 22 and 23, and clockwise as viewed in Fig. 20, to cause said arms 425 and 426 to engage the wheels of the storage device with the actuators 107 in the manner explained above. This clockwise movement of the arm 426 (Fig. 20) causes an angular camming surface 460 on the hook-shaped upper end of said arm 426, in cooperation with a stud 461 in the lever 307, to rock said lever counter-clockwise to move the notch 316 in the pawl 309 into engagement with the roller 317 and to retain said pawl in engagement with said roller during the first part of the fourth machine cycle in this operation. This causes the bar 291 to be shifted rearwardly during the first part of the fourth machine cycle in this operation to release the zero latches 120 (Fig. 10) in the manner explained above. In the first machine cycle of a Credit balance operation, the high portion 422 of the cam 391 also rocks the arm 426 clockwise (Fig. 20) to rock the lever 307 downwardly. However, this is of no importance at this time, as the lever 417 (Fig. 17), and connected mechanism, has previously rocked said lever 307 downwardly.

Upward movement of the plate 339 (Figs. 24, 26 and space K Fig. 32) as explained above, also frees the pawl 357 and when a large portion of the cam 361 engages the roller 366 in the latter part of the third machine cycle to return the lever 359 counter-clockwise to normal position, the pawl 357 engages the bent-over ear 358 of said lever to retain said lever in normal position.

This return movement of the lever 359 stretches the spring 377 when the stud 373 moves idly in the slot in the link 374 as return movement of the link 111 is obstructed at this time by an arcuate surface on said link in cooperation with the stud 110 in the arm 90. At the end of the third machine cycle in this operation, the stud 110 in the arm 90 is alined with the notch in the link 111, which permits the spring 377 to return the link 111 clockwise to disengage said link from the stationary stud 376 and to engage said link with the stud 111. It is therefore evident that the printing mechanism will be operable in the fourth machine cycle in this operation.

The surface 436 of the cam 391 (Fig. 22 and space J Fig. 32) retains the storage device in engagement with the racks 431 on the actuators 107 during initial movement rearwardly of the actuators in the fourth machine cycle in this operation, and said storage wheels are rotated clockwise by said actuators 107 to zero position. This positions the actuators 107 (Fig. 10) and the printing sectors 58 to represent the true negative credit balance and immediately thereafter the printing mechanism functions to record the true negative balance on the record material carried by the platen 56.

From the foregoing description it is therefore obvious that in credit balance operations the complementary amount of the credit balance is transposed to a true negative credit balance and recorded, and at the end of said credit balance operation the Balance totalizer and the storage device are left in a zeroized state.

The storage mechanism and the mechanism that drives the assembly of control cams, shown in Fig. 29, are similar to the corresponding mechanisms fully disclosed in co-pending application, Serial Number 605,160, which was filed April 14, 1932, by Charles L. Lee, and which issued on May 4, 1937 as Patent No. 2,079,355. Reference may be had to this patent for a more detailed description of this mechanism.

After the wheels of the storage device have been returned to zero position by the actuators 107 in the first part of the fourth machine cycle in this operation, the surface 436 on the cam 391 (Figs. 22, 23 and space J Fig. 32) moves beyond the roller 423 to permit the spring 435 to return the shaft 70 and the arms 425 and 426 clockwise to the position here shown, to disengage the storage device from the actuators and to render the aliner 433 effective to retain said storage wheels in zero position. Return of the lever 359 (Figs. 4 and 24) to normal position, at the end of the third machine cycle in this operation, causes said lever, in cooperation with the stud 369, to rock the latch 370 out of engagement with the stud 71 to permit said stud to engage the shoulder on the plate 69, when said plate is restored to normal position by the camming surface 92 on the crank 88 in the fourth machine cycle in this operation, to terminate operation of the machine. This disengaging of the latch 370 occurs after the cam 92 has moved beyond the roller 93 and consequently does not interfere with the fourth machine cycle in this operation.

Return movement downwardly of the link 111, in the fourth machine cycle, (Fig. 24) causes the stud 402 in the arm 403, in cooperation with the shoulder 401, to disengage the latch 396 from the ear 395 (Fig. 31) to permit the Credit balance key 332 to be returned upwardly by the spring 335 to undepressed position. When the key 332 (Fig. 22) returns to undepressed position, the notch therein reengages the ear 343 of the latch 341 to connect the plate 339 to said key 332.

*Sub-credit balance operations*

As previously explained, the only difference between a sub-credit balance and a credit balance operation is that in the fourth machine cycle of a sub-credit balance operation the Balance totalizer is engaged with the actuators 107 in subtract time, and as said actuators return the wheels of the storage device to zero position, the true negative balance is subtracted from the previously zeroized Balance totalizer to register the complementary amount of the overdraft in the Balance totalizer at the end of said operation.

Depressing the Sub-credit balance key 331 (Figs. 24 and 25) causes the parallel slots therein, in cooperation with the studs 336 and 337, to move the Credit balance key 332 downwardly in unison therewith, and permits the latch 396 to engage the ears 394 and 395 to retain said keys depressed. This causes the plate 339 (Figs. 22 and 26) to move the pawls 346 and 357 out of engagement with their respective levers 349 and 359 in exactly the same manner as depressing the Credit balance key 332 alone. Pivotally connected to the Sub-credit balance key 331 is a latch 439 adapted to be urged counter-clockwise, by a spring 440, into engagement with a flat surface on the stud 336. When the key 331 is in undepressed position, a finger 441 on the latch 439, in cooperation with the bottom surface of the bracket 76, retains said latch out of engagement with the stud 336 thereby making it possible to depress the Credit balance key 332 independently of the Sub-credit balance key 331. Depressing the Sub-credit balance key moves the finger 441 away from the bottom surface of the bracket 76 to cause the latch 439 to engage the stud 336 to connect the keys 331 and 332 into an integral unit.

Referring to Figs. 26 and 30, a forward extension on the lower end of the Sub-credit balance key 331 carries a stud 442 which cooperates with an L-shaped slot 443 in a pawl 444 fulcrumed on a stud 445 in the frame 50. When the Sub-credit balance key 331 is undepressed, the stud 442 in cooperation with the vertical portion of the slot 443 retains a rearward extension of the pawl 444 below a stud 447 in the pawl 346. Consequently when the key 331 is undepressed the pawl 444 does not interfere in any way with the pawl 346 and said pawl 346 functions in the manner explained earlier in connection with credit balance operations.

Depressing the Sub-credit balance key 331 moves the stud 442 into the horizontal portion of the slot 443 permitting a torsion spring 446 to rock said pawl counter-clockwise to move the rearward projection thereof into the path of the stud 447 to block return movement of the pawl 346 under influence of the spring 347 when the plate 339 is restored upwardly, independently of the keys 331 and 332, in the first machine cycle of a sub-credit balance operation.

The first three machine cycles of a sub-credit balance operation are exactly the same as the first three machine cycles of a credit balance operation, explained above. However, near the end of the third machine cycle of a sub-credit balance operation, when the node 438 (Fig. 26 and space L Fig. 32) of the cam 355, in cooperation with the roller 354, restores the lever 349 and the shaft 352 to normal position, the pawl 346, being retained in ineffective position by the pawl 444 in cooperation with the stud 447, does not latch the lever 349 in normal position; consequently said lever moves in relation to the contour of a surface 448 on the cam 355. The surface 448 is of the same radius as the surface 434, and, in cooperation with the roller 354, rocks the shaft 352 to cause the finger 420 (Fig. 17) to engage the stud 421 to rock the lever 197 clockwise to condition the Balance totalizer for a second subtracting operation. This means that the wheels of the Balance totalizer will be engaged with their respective racks 431 on the actuators 107 (Fig. 10) prior to initial movement rearwardly of said actuators, in the first part of the fourth machine cycle of a Sub-credit balance operation. It will be recalled that the wheels of the storage device, which now contain a true negative sub-credit balance, remain in engagement with the actuators 107 during the movement rearwardly by the actuators in the fourth machine cycle and cause the positioning of said actuators to the true negative balance. As the actuators 107 are positioned under the control of the wheels of the storage device, they subtractively rotate the wheels of the Balance totalizer to subtract therefrom the true negative sub-credit balance, which leaves on said wheels the complementary amount of the sub-credit balance. After the actuators 107 complete their initial movement rearwardly, the printing mechanism functions to imprint the true negative amount of the sub-credit balance upon the record material carried by the platen roll 56.

In the last part of the fourth machine cycle of a sub-credit balance operation a stud 449 (Figs. 26 and 30), carried by the cam 355 engages a finger 450 of the pawl 444 to rock said pawl clockwise to disenegage the rearward extension thereof from the stud 447 to permit the pawl 346 to be spring-returned to the position shown in Fig. 30, where the stud 447 overlies the rearward projection of the pawl 444 to obstruct counter-clockwise movement of said pawl under influence of the torsion spring 446, when the stud 449 moves beyond the finger 450. Near the end of the fourth machine cycle of a sub-credit balance operation a node 451 on the cam 355 (Fig. 26 and space L Fig. 26), identical to the node 438, engages the roller 354 to restore the lever 349 and the shaft 352 counter-clockwise, as here viewed, to normal position, thus permitting the pawl 346 to immediately engage the ear 348 to retain the lever 349 and the shaft 352 in normal positions. Return movement downwardly of the link 111 (Fig. 24) in the fourth machine cycle of a sub-credit balance operation causes the stud 402, in cooperation with the shoulder 401, to rock the surface 399 of the pawl 396 out of engagement with the ears 394 and 395 of the keys 331 and 332, to permit said keys to be spring-returned upwardly to undepressed positions. Return movement upwardly of the key 331 disengages the latch 439 from the stud 336 in the manner explained previously.

Symbol printing mechanism

It is desirable that a distinguishing symbol be printed opposite the credit balance and sub-credit balance items and the movement of the arm 426 (Fig. 20) when the storage device is engaged with the actuators is used to accomplish this result. In the latter part of the third machine cycle of a credit balance or sub-credit balance operation, the high portion 436 (Fig. 22) of the cam 391, in cooperation with the roller 423, rocks the shaft 70 and the arms 425 and 426 counter-clockwise to engage the wheels of the storage device with the actuators in the manner explained earlier herein. The surface 436 of the cam 391 retains the arms 425 and 426 in engaging position until after the printing mechanism has functioned in the fourth machine cycle.

Engaging movement clockwise of the arm 426, as viewed in Fig. 20, causes a camming surface 553 on a forward extension thereof, in cooperation with a roller 554 on a slide 555 shiftably mounted by means of parallel slots therein in cooperation with stationary studs in the frame 51, to shift said slide 555 forwardly. Forward movement of the slide 555 by means of a link 556, connecting said slide to a crank 557 secured on a shaft 558 journaled in the frames 50 and 51, rocks said crank and said shaft counter-clockwise, as viewed in Fig. 20, and clockwise as viewed in Fig. 3. Clockwise movement of the shaft 558 (Fig. 3) moves an arm 559 secured on the right-hand end of said shaft in unison therewith, which movement by means of a link 560 connecting said arm to a lever 561 pivoted at 562 to the frame 50, rocks said lever 561 also clockwise. The lever 561 is connected by a link 563 to the symbol sector 59. Consequently, clockwise movement of said lever 561 properly positions the sector 59 to cause the symbol CR to be printed adjacent credit balance or sub-credit balance items in the fourth machine cycle of either type of balance operation. The slide 555 also has a plurality of camming lugs thereon which, in cooperation with the lower ends of the stems of the control keys 102, position the symbol sector 59 to cause a symbol, indicative of the type of operation being performed to be printed adjacent the item.

In the second machine cycle of a credit balance or a sub-credit balance operation, conditioning the balance totalizer for a subtract operation causes the mechanism shown in Fig. 17 and explained earlier herein to operate the ribbon color control mechanism, to cause the red portion of the inking ribbon to be moved to printing position. Inasmuch as the printer mechanism is disabled during the first three cycles, the mechanism shown in Fig. 12, including the arm 275 and bar 269, does not return the color control mechanism to black printing position until after printing has been completed in the fourth machine cycle. It is therefore obvious that credit and sub-credit balances and their symbol will be printed in red to distinguish them from other items.

Credit balance key locking mechanism

When the Balance totalizer is in a positive condition or in a zeroized condition, that is, not overdrawn, the Credit balance key is locked against depression. and inasmuch as it is impossible to depress the Sub-credit balance key without also depressing the Credit balance key, the Sub-credit balance key is likewise locked against depression. When the highest order wheel of the Balance totalizer passes from zero to 9 while being rotated in a subtractive direction, mechanism operated thereby unlocks the Credit balance key and simultaneously locks the Balance key against depression. If subsequent to an overdraft an amount is added in the Balance totalizer sufficiently large to overcome said overdraft, the passing of the highest order wheel from nine to zero, while being rotated in an additive direction, locks the Credit balance key against depression and simultaneously unlocks the Balance key.

At the end of a Credit balance operation, the wheels of the Balance totalizer are returned to and left standing in zero position, and in such case the highest order wheel does not pass additively from nine to zero but is subtractively rotated to zero; consequently the mechanism that locks the Credit balance key against depression is not restored to effective position, however, restoration of the Credit balance key to undepressed position restores the locking mechanism to effective position, in a manner presently to be described. In a sub-credit balance operation, the complement of the sub-credit balance is reentered in the Balance totalizer and remains in said totalizer upon completion of said operation. In this case it is desirable that the Balance key remain locked and that the Credit balance key remain unlocked, therefore, depressing the Sub-credit balance key causes the mechanism which restores the locking mechanism, when the Credit balance key is depressed, to be rendered ineffective. The Credit balance key locking mechanism will now be described in detail and said description will include a brief description of the Balance totalizer transfer mechanism.

At the beginning of a subtract operation, a restoring bar 452 (Figs. 14 to 16—A) extending between two arms 453 (only one here shown), pivoted on studs in the totalizer frame 152, is rocked counter-clockwise to restore the transfer mechanism, including the operating arms for the transfer cams, the add tripping pawls 205 and the subtract tripping pawls 206, to untripped position. After restoring movement, the bar 452 is retained in an intermediate position as shown in Figs. 14, 15 and 16—A. When the highest order wheel 204 of the Balance totalizer passes from zero to nine while being rotated in a subtractive direction, one of the diametrically opposed teeth on the tripping cam 207 engages and rocks its corresponding tripping pawl 206 clockwise to disengage a bent-over ear 454 thereof from a shoulder on an overdraft shaft actuator 455 rotatably mounted on a rod 456 supported by the totalizer frame 152. This releases the actuator 455 to the action of a spring 457, which moves said actuator a slight distance clockwise until a downward extension 458 thereof contacts the bar 452.

After the Balance totalizer has been disengaged from the actuators, the restoring bar 452 is released to the action of springs, which immediately rock it the full distance clockwise to the position shown in Fig. 16 to permit the functioning of all tripped transfer pawls. The spring 457 moves the actuator 455 in unison with the bar 452 causing a shoulder on said actuator, in cooperation with a bent-over extension 459 of an arm 465 secured on an overdraft shaft 466 journaled in the frame 152, to rock said arm 465 and said shaft 466 counter-clockwise. Secured on the overdraft shaft 466 (Figs. 9, 14 and 17), is a crank 467 connected by a link 468 to a pitman 469, one end of which is slotted to embrace a stud 470 in the frame 51 and the other end of which is pivotally connected to a latch 471 loose on the stud 281. Counter-clockwise movement of the shaft 466, as viewed in Figs. 14 and 17, and the crank 467 under influence of the actuator 455 rocks the latch 471 also counter-clockwise to engage a bent-over ear 472 of said latch with a notch 473 in the stem of the Balance key 102. This locks the Balance key 102 against depression when the Balance totalizer is in an overdrawn condition.

The actuator 455 rocks the overdraft shaft 466 counter-clockwise as viewed in Figs. 14 to 17, and clockwise as viewed in Figs. 3 and 9. Clockwise movement of the shaft 466 (Figs. 3 and 9) and a crank 474 secured on right-hand end of said shaft by means of a link 475 rocks a pawl 476 (Fig. 26), loose on the stud 397, also clockwise to disengage a shoulder 477 of said pawl from the ear 395 of the Credit balance key 332. It is therefore evident that when the Balance totalizer is overdrawn the Balance key 102 is locked against depression and the Credit Balance key 332 is unlocked, so that it may be depressed to initiate a credit balance operation. Inasmuch as it is impossible to depress the Sub-credit balance key 331 without also depressing the Credit balance key 332, the pawl 476 also controls depression of the Sub-credit balance key 331.

When the Balance totalizer is in an overdrawn condition, if an amount large enough to overcome the overdraft is added into said Balance totalizer, the overdraft shaft 466 (Fig. 16A) will be restored to normal position to unlock the Balance key and to lock the Credit balance key against depression. When the highest order wheel 204 of the Balance totalizer passes from nine to zero while being rotated in an additive direction, one of the diametrically opposed teeth on the tripping cam 207 engages the end of the corresponding add tripping pawl 205 and rocks said pawl counter-clockwise to disengage an ear 478, on said tripping pawl 205, from a shoulder 479 on an overdraft shaft restoring pawl 480 pivoted on the rod 456. This releases the pawl 480 to the action of a spring 481, which rocks said pawl clockwise until a projection 482 thereof engages the restoring bar 452, which at this time is in its intermediate position.

After the wheels of the Balance totalizer have been disengaged from the actuators, the bar 452 is released and is spring-returned full distance clockwise to permit the spring 481 to rock the pawl 480 clockwise in unison therewith to cause the shoulder 479 in cooperation with a bent-over ear 483 on the arm 465 to rock said arm and the overdraft shaft 466 clockwise, as viewed in Figs. 14 and 16A, to normal position. This clockwise movement of the overdraft shaft 466 ear 472 thereof from the notch 473 in the Balance key 102 to unlock said Balance key and this return movement of the overdraft shaft 466, rocks the latch 471 clockwise to disengage the which is counter-clockwise as viewed in Figs. 3 and 26, rocks the pawl 476 counter-clockwise to engage the shoulder 477 thereof with the ear 395 to lock the Credit balance key 332 and the Sub-Credit balance key 331 against depression.

When the shaft 219 (Fig. 14) is rocked clockwise from adding to subtracting position to shift the add pawls 205 to ineffective position and to move the subtract pawls 206 to effective position, a bar 484 integral with said shaft moves from beneath a shoulder on the actuator 455, to permit said actuator to function in the manner explained above, and said bar 484 moves into the path of a downward projection on the restoring pawl 480 to block movement of said restoring pawl in subtract operations. It is therefore evident that the actuator 455 is operable only in subtract operations and that the restoring pawl 480 is operable only in adding operations.

In credit balance operations, the wheels of the Balance totalizer are left in a zeroized condition and inasmuch as the highest order wheel does not pass from nine to zero, while being rotated in an additive direction, but is merely reversely or subtractively rotated to zero position, the mechanism shown in Fig. 16A does not function to return the overdraft shaft 466 clockwise to normal position. It is therefore necessary to use other means to return the overdraft shaft to normal position in credit balance operations and such mechanism will now be described.

Depressing the Credit balance key 332 (Figs. 26 and 27) causes the ear 395 to move beyond a shoulder 485 on an overdraft shaft restoring arm 486 slotted to fit loosely on the stud 397 and normally maintained in downward position as shown in Fig. 27 by a spring 487. When the ear 395 passes beyond the shoulder 485, a spring 488, one end of which is connected to the upper end of the arm 486, immediately rocks said arm counter-clockwise to latch the shoulder 485 over the ear 395. In the fourth machine cycle of a credit balance operation, when the mechanism shown in Figs. 24 and 28 releases the pawl 396, the spring 335, which is much stronger than the spring 487, returns the Credit balance key 332 upwardly to undepressed position. The Credit balance key in moving upwardly to undepressed position carries the arm 486 in unison therewith, as shown in Fig. 26, to cause a bent-over ear 489 on said arm 486 in cooperation with an angular surface on the pawl 476 to rock said pawl counter-clockwise from ineffective position as shown in Fig. 27 to effective position as shown in Fig. 26. This counter-clockwise movement of the pawl 476 by means of the link 475, also returns the overdraft shaft 466 (Fig. 14) to normal position to disengage the latch 471 from the notch in the Balance key 102.

In the operation immediately following a credit balance operation, initial movement counter-clockwise of the arm 90 (Fig. 26) causes a rounded surface 490 on said arm to engage a similar rounded surface 491 on the end of the arm 486 to rock said arm 486 clockwise to disengage the shoulder 485 from the ear 395 to permit the spring 487 to return said arm 486 downwardly to normal position as shown in Figs. 24 and 27. After the arm 90 in its return movement, moves away from the rounded end of the arm 486 the spring 488 causes the upper end of said arm 486 to resiliently engage the ear 395 of the Credit balance key 332. During a credit balance operation when the parts are in the position shown in Fig. 27, the arm 90 rocks the shoulder 485 of the arm 486 out of engagement with the ear 395 but upon return movement of said arm 90 the shoulder 485 always reengages the ear 395 and as it is the downward or return movement of the arm 90 and the link 111 (Fig. 24) that disengages the pawl 396 the shoulder 485 of the arm 486 is latched over the ear 395 at this time and moves upwardly in unison with the Credit balance key 332 to restore the overdraft pawl 476 and the overdraft shaft 466 in the manner explained above.

In sub-credit balance operations, the complementary amount of the overdraft is returned to the Balance totalizer wheels and remains in said wheels at the end of the operation. Consequently the Balance totalizer is still in an overdrawn condition and in this case it is desirable that the latch 476 remain in ineffective position, as shown in Fig. 27, and that the Balance key 102 remain locked against depression.

Pivoted on the Sub-credit balance key 331 (Fig. 24) is a latch 492, spring-urged counter-clockwise into contact with the stationary stud 334. Depressing the Sub-credit balance key 331 withdraws the latch 492 from the stud 334, permitting said latch to be rotated counter-clockwise until a rounded nose on the end thereof resiliently engages a stud 493 carried by the arm 486. Initial movement counter-clockwise of the arm 90 in the first machine cycle of a sub-credit balance operation causes the surface 490 in co-operation with the surface 491 on the end of the arm 486 to rock said arm clockwise to move the shoulder 485 thereon out of the path of the ear 395 (Fig. 27) on the Credit balance key 332. This clockwise movement of the arm 486 causes the stud 493 to by-pass the hook on the latch 492 whereupon said hook immediately latches over said stud 493 to retain the arm 486 in clockwise position out of the path of the ear 395 on the Credit balance key 332.

It will be recalled that when the Sub-credit balance key 331 is depressed the Credit balance key 332 is also depressed in unison therewith. Consequently when the pawl 396 is rocked to ineffective position in the fourth machine cycle of a Sub-credit balance operation, both keys will be restored upwardly simultaneously. Inasmuch as the latch 492 retains the shoulder 485 of the arm 486 out of the path of the ear 395 until said ear moves beyond said shoulder, the arm 486 is not carried upwardly in unison with the key 332 and consequently does not restore the pawl 476 counter-clockwise to effective position but allows said pawl to remain in the position shown in Fig. 27. After the ear 395 on the key 332 has moved beyond the shoulder 485, the latch 492 engages the stationary stud 334 and is rocked clockwise, by continued upward movement of the Sub-credit balance key 331, out of engagement with the stud 493 in the arm 486.

*Control of addition in totalizers during credit balance and sub-credit balance operations*

When the traveling carriage is tabulated to the balance column on the record sheet where all balances which in certain cases includes a sub-credit balance followed by a credit balance, are recorded, a control element on the traveling carriage, in cooperation with a hanging bar lever, selects the #2 totalizer for addition in order to accumulate and preserve a total of the new balances. This total new balance is used in proof operations at the end of a certain period and it is desirable to accumulate the complementary amount of the negative balances as well as the positive balances. Therefore in the first machine cycle of credit balance and sub-credit balance operations the #2 totalizer is selected for addition in order to accumulate the complementary amount of the credit or sub-credit balance. Inasmuch as the traveling carriage remains in one columnar position, that is, the Balance column position, during the four machine cycles of a credit balance or sub-credit balance operation, normally the #2 totalizer would be selected for addition during each of these four machine cycles of operation and the complementary amount of the overdraft as well as the negative amount of the overdraft would be added in the

2 totalizer several times, creating an erroneous condition. In order to prevent such an occurrence, mechanism has been devised which functions after the first machine cycle of a credit balance or sub-credit balance operation to prevent selection and conditioning of the #2 totalizer for addition during the last three machine cycles of said operation. Such mechanism will now be described.

When the traveling carriage 55 (Figs. 3, 18 and 21) tabulates to the balance column, a control element 510 mounted on a bar 494 carried by said traveling carriage, in cooperation with an upturned extension of a #2 add hanging bar lever 495 pivoted on a stud 496 in the crossframe 53, rocks said lever 495 clockwise. The lever 495 is connected by a hanging bar 497 to an add control pawl 498 pivoted on the frame 51. The clockwise movement of the lever 495 lifts the bar 497 to rock the pawl 498 counter-clockwise to disengage the rearward end of said pawl from the tooth of a #2 add control crank 499 pivoted on the frame 51. The crank 499 carries a stud 500 which cooperates with a projection on the pitman 179.

In the first machine cycle of a credit balance or sub-credit balance operation, initial movement clockwise of the plate 173 moves the arcuate surface 183 on said plate beyond the shoe 182 to permit the crank 499 to be spring-urged counter-clockwise to move the stud 500 out of cooperative relationship with an upward extension of a #2 add engaging pawl 501 pivoted on the upper end of a #2 flying lever 502 pivoted on the plate 173. This permits a downward extension of the pawl 501 to be engaged by a square stud 503 in the plate 173 to terminate movement of the flying lever 502 in relation to the plate 173 and to cause unitary movement of said flying lever and said plate.

Unitary movement clockwise of the flying lever 502 with the plate 173, by means of a link 504 connecting said flying lever to a crank 505 secured on a #2 engaging shaft 506 journaled in the totalizer frame 152 (Fig. 17), rocks said crank 505 and said #2 engaging shaft 506 clockwise to engage the wheels of the #2 totalizer with the actuators 107 after said actuators have completed their initial movement rearwardly. Return movement forwardly of the actuators adds the complementary amount of the credit or sub-credit balance in the #2 totalizer. The #2 totalizer engaging mechanism functions in exactly the same manner as the #1 totalizer engaging mechanism shown in Fig. 17 and fully explained earlier herein.

Near the end of the first machine cycle of a credit or sub-credit balance operation, return movement counter-clockwise of the plate 173 (Fig. 18), in cooperation with the shoe 182, rocks the lever 180 clockwise to restore the pitman 179 upwardly, which in cooperation with the stud 500 restores the crank 499 to normal position. However, inasmuch as the traveling carriage remains in the balance column during the four machine cycles of a credit balance or sub-credit balance operation, the pawl 498 remains in its counter-clockwise position, out of the path of the projection on the crank 499, which ordinarily would permit the pitman 179 and the crank 499 to move to adding position during each succeeding machine cycle of the credit balance or sub-credit balance operation were it not for means now to be described, which becomes effective during the first machine cycle of said credit balance or sub-credit balance operation to obstruct downward movement of the pitman 179, to prevent addition in the #2 totalizer during the three remaining machine cycles of these operations.

Referring to Figs. 3, 9, 17 and 18, the arm 114 secured on the printer shaft 133 carries a stud 507 which engages a slot in the forward end of a link 508, the rearward end of which is pivoted on an arm of a yoke 509 rotatably mounted on the shaft 257. The left arm of the yoke 509 carries a stud 515 which is engaged by a slot in one end of a link 516 the other end of which is slotted to embrace a stationary stud 517 in the frame 51. A spring 518 tensioned between the stud 515 and the link 516 normally maintains the forward end of the slot in said link in resilient contact with the stud 515 and forms a yielding connection between said link 516 and said stud 515.

In the first machine cycle of one of these operations, initial movement clockwise of the plate 173 permits the pitman 179 to move downwardly upon counter-clockwise movement of the crank 499 to select the #2 totalizer for addition in the manner explained above. This moves a stud 519 in the upper end of said pitman 179 into the path of an upward projection 520 of the link 516. It will be recalled that in credit balance and sub-credit balance operations, the link 111 (Fig. 24) which forms an operative connection between the arm 90 and the printer shaft 133, is moved out of engagement with the stud 110 in the arm 90 and consequently remains stationary during the first three machine cycles of a credit or sub-credit balance operation. Therefore, at the beginning of said operation the arm 114 mounted on the printer shaft 133 and the stud 507 remain stationary, to retain a foot-shaped projection 521 (Figs. 3 and 9) of the link 508 in the path of a stud 522 in the cam arm 138, which it will be recalled operates the aliner for the actuators 107. Near the end of the initial movement of the main drive shaft 91 and the arm 90 the roller 164, in cooperation with the cam slot 137, rocks the arm 138 clockwise causing the stud 522 to engage the foot 521 and shift the link 508 rearwardly to rock the yoke 509 clockwise as viewed in Figs. 3 and 9 and counter-clockwise as viewed in Figs. 17 and 18.

Inasmuch as the pitman 179 (Fig. 18) is down at this time the stud 519 therein, in cooperation with the projection 520, blocks rearward movement of the link 516; consequently counter-clockwise movement of the yoke 509 causes the stud 515 to move idly in the slot in said link, thereby increasing the tension of the spring 518. Return movement of the plate 173, at the end of the first machine cycle of a credit or sub-credit balance operation, restores the pitman 179 upwardly whereupon the spring 518 shifts the link 516 rearwardly to move the projection 520 under the stud 519 to retain said pitman and the crank 499 in non-add position, as here shown during the remaining three machine cycles of these operations. When the projection 520 (Fig. 18), in cooperation with the stud 519, retains the pitman 179 and the crank 499 in non-add position, initial movement clockwise of the shaft 91 and the plate 173, and corresponding relative movement of the flying lever 502 causes the upper extension of the pawl 501 to engage the stud 500 to rock the lower extension of said pawl out of the path of the stud 503, thereby preventing said flying lever 502 from imparting clockwise engaging movement to the crank 505 and the #2 engaging shaft 506 and effecting what is commonly termed a non-add operation.

At the end of the third machine cycle of a credit or sub-credit balance operation, the printer operating link 111 (Figs. 3 and 9) is reconnected to its operating arm 90 and operates the printer mechanism in the fourth machine cycle of these operations in the manner explained earlier herein, to record the true negative amount of the credit or sub-credit balance.

The ball of the yoke 509 (Figs. 3 and 12) fits in a notch in an arm 523 loose on the shaft 257 and when the yoke 509 and the arm 523 are rocked clockwise, as explained above, an upward extension of the arm 523 engages the stud 268 to shift the bar 269 rearwardly in unison therewith, to move the pawl 271 to the position indicated by dot and dash lines in Fig. 12. Initial movement clockwise if the printer shaft 133 and the arm 246 in the first part of the fourth machine cycle of these operations causes the arm 275 to by-pass the pawl 271. Return movement counter-clockwise of the printer shaft 133, the arm 246, and the restoring arm 275 causes said arm 275 to engage the pawl 271 to restore the bar 269 forwardly in the manner previously explained. This causes the stud 268 to cooperate with the arm 523 during the later part of the fourth machine cycle to restore the yoke 509 counter-clockwise, as here viewed, and clockwise as viewed in Fig. 18 to normal position to move the projection 520 of the link 516 forwardly out of the path of the stud 519 in the pitman 179. An angular tooth 524 (Fig. 12) of a spring-pulled retaining pawl 525 pivotally connected to the lower end of the arm 523, in cooperation with the shaft 264, retains the arm 523 and the yoke 509 in either of their two positions.

*Carriage control of Credit balance key and releasing mechanism*

A locking mechanism is provided between the traveling carriage and the machine releasing mechanism, to prevent releasing the machine for operation when the traveling carriage is out of columnar position, for example, when the carriage is being tabulated from one column to the next, or when said carriage rebounds slightly from tabulated position. A connection between the above locking means and the Credit balance key 332 prevents depression of this key and the Sub-credit balance key 331, when said locking means is effective.

Referring to Figs. 3, 4 and 21, when the traveling carriage is tabulated to a columnar position, a lug on the control element 510, in cooperation with a hanging bar lever 528 similar to the #2 add hanging bar lever 495, rocks said hanging bar lever clockwise, as viewed from the front of the machine, to lift a link 529 connecting said lever 528 to a crank 530 secured on a control shaft 531 journaled in the frames 50 and 51. The lifting of the link 529 rocks the crank 530, the shaft 531 and an arm 532 secured on said shaft, counter-clockwise. Counter-clockwise movement of the arm 532 by means of the bifurcated end thereof, which embraces a stud 533 in the arm of a release locking plate 534 pivoted on a stud 535 in the frame 50, rocks said plate 534 clockwise. Clockwise movement of the plate 534 moves a shoulder on the lower end thereof out of the path of a square stud 536 in the lever 80 and moves a clearance opening 537 in the lower end of said plate 534 opposite said stud 536. This frees the lever 80 for counter-clockwise releasing movement. Obviously when the traveling carriage is out of columnar position the locking plate 534 remains effective to prevent releasing movement of said lever 80.

The arm 532 is connected by a closely-wound spring 538 to a pawl 539 loose on the stud 397. Consequently when the traveling carriage is tabulated to columnar position, counter-clockwise movement of the arm 532 rocks the pawl 539 counter-clockwise in unison therewith to move the upper end of said pawl out of the path of the bent-over ear 395 on the Credit balance key 332 to free the Credit balance key for depression. When the traveling carriage moves out of columnar position, a spring 540, one end of which is connected to the stud 533, rocks the locking plate 534 to locking position, as here shown, and rocks the arm 532 clockwise to cause a stud therein, in cooperation with a shoulder 541 on the pawl 539, to return said pawl under the ear 395 to lock the Credit balance key 332 against depression. Inasmuch as it is impossible to depress the Sub-credit balance key 331 without also depressing the Credit balance key 332, the pawl 539 also controls the Sub-credit balance key 331 in exactly the same manner as it controls the Credit balance key 332.

With the traveling carriage out of columnar position and the locking plate 534 effective, as shown in Fig. 4, to block counter-clockwise releasing movement of the lever 80, absence of the pawl 539 would permit depression of either of the keys 331 or 332 and consequential releasing of the lever 359 to the action of the spring 365 without setting the machine in motion. In addition the pawl 539 prevents depression of either of the keys 331 or 332 when the traveling carriage is out of columnar position.

*Interlock between the #1 add key and the Credit balance key*

An interlock mechanism is provided between the #1 add key and the Credit balance key to prevent depression of either of said keys when the other key is depressed.

Calling attention to Figs. 3, 9 and 17, a rounded surface 542 on the end of the #1 add key 103 is arranged to cooperate with a bent-over ear 543 on the left arm of a yoke 544, the right and left arms of which are turnably mounted on the shaft 352. The right-hand arm of the yoke has a stud 545 in the upper end thereof, which engages a slot in a link 546 shiftably mounted by means of parallel slots therein, in cooperation with the studs 78 and 397.

Depressing the #1 add key 103 rocks the yoke 544 counter-clockwise, as viewed in Fig. 17, and clockwise as viewed in Figs. 3 and 9 which movement by means of the stud 545, shifts the link 546 rearwardly, against the action of a spring 547, to move an upturned lug 548 on said link beneath a flat surface of the stud 336, which, it will be recalled by referring to Fig. 26, is secured in the stem of the Credit balance key 332. This blocks depression of the Credit balance key 332, which in turn blocks depression of the Sub-credit balance key 331 when the #1 add key is depressed. Releasing the #1 add key permits the spring 547 to return the link 546 forwardly to move the lug 548 from beneath the stud 336. Depressing the key 332 moves the stud 336 into the path of the lug 548 to prevent depression of the #1 add key 103.

Mode of operation

The mode of operation will be explained in connection with a fragmentary portion of a ledger sheet 551 and a fragmentary portion of a journal sheet 552 (Fig. 2.) The journal sheet is carried by the platen roll and is long enough to include all the transactions for a certain business period, for example, for one day. There is a ledger sheet 551 for each customer, and each customer's account is audited daily. The ledger sheets 551 are inserted in the throat of a front feed carriage or platen, adjusted to the proper line, and the throat closed. A carbon sheet (not shown), interposed beween the ledger sheet 551 and the journal sheet 552, causes all the entries on the ledger sheet to be duplicated upon the journal sheet. The journal sheet extends beyond the right-hand end of the ledger sheet to permit two columns of figures to be entered thereon, said columns of figures being unnecessary on the ledger sheet.

The system chosen for illustration is that of a wholesale drug company, in account with John Doe, a retail druggist. In starting a new account, such as this, with the traveling carriage in its extreme left-hand or last columnar position and with the throat of the front feed platen open, John Doe's ledger card is withdrawn from the file, inserted in the open throat, alined with the printing mechanism and the throat closed. When a new account is started, there is no work to be done in this last column, so depressing the starting bar 75 (Fig. 1) initiates an idle operation during which the carriage is returned to its extreme right-hand or first columnar position. On October 19, John Doe purchased $50.00 worth of merchandise having a folio number of 2345. This folio number, 2345, is set up on the amount keys, and in a non-adding operation said folio number and the date, October 19, are printed in their respective divisions of the first column. The traveling carriage then automatically tabulates to the Charge column where the Balance totalizer is selected for addition, the amount of the charge, $50.00, is set up on the amount keys, and the machine released for operation, during which the charge of $50.00 is added in the #1 or Balance totalizer and simultaneously recorded upon the ledger sheet and the journal sheet.

The next column on the ledger sheet is the Credit column, and inasmuch as there are no credits at this time, the traveling carriage is skip-tabulated to the Balance column by using the skip-tabulated starting bar 97 (Fig. 1), the Balance totalizer is operated in a sub-total operation and the amount therein, $50.00, is recorded in the Balance column on the ledger sheet.

The last column on the ledger sheet is a Second pick-up of old balance column, and inasmuch as in this particular case there was no previous balance, the traveling carriage is skip-tabulated to the Posting column on the journal sheet, and in a total recording operation, the total amount of the charge, $50.00, is cleared from the Balance totalizer and printed in said Posting column.

After the total of $50.00 has been printed in the Posting column on the journal sheet, the traveling carriage automatically tabulates to the First pick-up of old balance column on said journal sheet, which is the extreme left-hand position of the traveling carriage, the throat opens automatically and John Doe's ledger sheet is removed therefrom. All accounts that were active on October 19 are audited in a similar manner to John Doe's account.

On October 20, John Doe purchased goods valued at $25.00; so his ledger sheet is again withdrawn from the file, placed in the open throat of the traveling carriage, the last line of printing thereon alined with the printing mechanism, and the throat closed. The previous debit balance of $50.00 is ascertained from the Balance column of the ledger sheet, set up on the amount keys, and upon release of the machine for operation, is added in the Balance totalizer and printed in the First pick-up of old balance column on the journal sheet, after which the traveling carriage is automatically returned to its extreme right-hand position and the record material is simultaneously line-spaced. The folio number of the goods purchased, 2544, is set up on the amount keys, and in a non-add operation said folio number and the date, October 20, are printed in their respective divisions of the first column. The traveling carriage automatically tabulates to the Charge column where the amount of the purchase, $25.00, is added in the Balance totalizer.

As there are no credits, the Credit column is skipped, by using the bar 97, and in a sub-balance recording operation the debit balance of $75.00 is recorded in the Balance column. The traveling carriage then tabulates to the Second pick-up of old balance column on the ledger sheet and in this position the Balance totalizer is selected for a subtract operation. The amount of the old balance, $50.00, is again set up on the amount keys and in a subtract operation this amount is subtracted from the new debit balance of $75.00. The traveling carriage tabulates to the Posting column on the journal sheet, and in a total recording operation the Balance totalizer is cleared and the amount of the charge item, $25.00, is printed in the Posting column, which constitutes the method of proof used in this particular system. Next the traveling carriage is tabulated to the First pick-up of old balance column on the journal sheet and the throat of the front feed platen is automatically opened.

In auditing John Doe's account for October 21, the previous old balance of $75.00 is set up on the amount keys, printed in the First pick-up of old balance column of the journal sheet and simultaneously added in the Balance totalizer, after which the traveling carriage is automatically returned to its extreme right-hand position and the record material is simultaneously line-spaced. In this case the folio number, 2765, is set up on the amount keys, and in a non-add operation it and the date are printed in their respective divisions. As there are no charges at this time, the traveling carriage is skip-tabulated to the Credit column, in which the Balance totalizer is selected and conditioned for a subtract operation. The amount of the credit, $135.00, is entered on the amount keys, and upon operation of the machine, is subtracted from the Balance totalizer and simultaneously printed in red in the Credit column.

The traveling carriage then tabulates to the Balance column and the operator is appraised of the fact that the Balance totalizer is overdrawn by the locking of the Balance key. Depressing the Sub-credit balance key 331 (Fig. 1) releases the machine for a Sub-credit balance operation during which the true negative amount of the credit balance, $60.00, is printed in red in the Balance column, an identifying symbol, CR, is simultaneously printed adjacent the credit balance, and the complement of the sub-credit balance is reentered in the Balance totalizer. The traveling carriage then tabulates to the Second pick-up of old balance column on the ledger sheet, and the previous old balance of $75.00 is again entered on the amount keys and in a subtract operation is subtracted from the complement of the credit balance of $60.00. The traveling carriage then tabulates to the Posting column on the journal sheet and in a Credit balance operation, initiated by depressing the Credit balance key 332, the complementary amount in the Balance totalizer is transposed to a true negative amount, and this true negative amount of $135.00 is printed in red in the Posting column, thus proving the credit of $135.00.

On October 22, John Doe's account was also active and the previous credit balance of $60.00, ascertained from the Balance column of the ledger sheet, is entered on the amount keys, the Subtract key 102 depressed, and in a subtract operation this credit balance of $60.00 is entered negatively in the Balance totalizer and printed in the First pick-up of old balance column of the journal sheet. On this date John Doe purchased goods valued at $15.00, and this amount is added in the Balance totalizer. As there are no credits, the traveling carriage is skip-tabulated to the Balance column, and as there is still a credit balance in favor of John Doe, the Sub-credit balance key 331 is depressed to initiate a sub-credit balance operation during which the amount of the credit balance, $45.00, and its identifying symbol are printed in red in the Balance column. After this the traveling carriage tabulates to the Second pick-up of old balance column on the ledger sheet, and the previous old balance of $60.00 is entered on the amount keys, and as this is a credit balance, it is necessary to add this amount in the Balance totalizer in order to properly prove the account. Depressing the #1 add key 103 selects and conditions the balance totalizer for adding, and upon release of the machine for operation the amount of the old balance, $60.00, is added to the complement of the credit balance of $45.00. The traveling carriage then tabulates to the Posting column and in a balance operation the Balance totalizer is cleared and the amount, $15.00, of the charge, is printed in the Posting column of the journal sheet.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of printing means; an add-subtract totalizer; a non-accumulating storage device; actuators for operating the totalizer and storage device; means to engage the totalizer with the actuators; means to engage the storage device with the actuators; a control member; means rendered effective by actuation of the member to control the operation of the totalizer engaging means and storage device engaging means to thereby control the totalizer and the storage device in their selective engagement with and disengagement from the actuators and actuation by said actuators, to transpose the complementary amount of an overdraft to a true negative balance, enter said true negative balance in the storage device, then clear said true negative balance from the storage device and simultaneously subtract it from the zeroized totalizer to reenter the complement in said totalizer; and means rendered effective by actuation of the control member to control the printing means to cause the true negative balance to be printed as it is cleared from the storage device.

2. In a calculating machine, the combination of printing means; a balance totalizer; a storage device; actuators for the totalizer and the storage device; means to engage the totalizer with the actuators; means to engage the storage device with the actuators; means including a plurality of movable cams and parts operated by the cams during the movement of the cams to control the printing means, and also control the operation of the engaging means for the totalizer and storage device to control the totalizer and the storage device in their engagement with and disengagement from the actuators, to cause the complement of an overdraft, contained in the totalizer, to be transposed to a true negative amount, said true negative amount printed and the complement of the overdraft set up on the balance totalizer for further use, and means for moving the cams.

3. In a machine of the character described operable to perform one machine cycle and four machine cycle operations and having printing means, the combination of an adding and subtracting totalizer; a non-accumulating storage device; actuating means for the totalizer and the storage device; means for engaging the totalizer with and disengaging the totalizer from the actuating means; a depressible sub-overdraft control member; means controlled by the totalizer for locking the member against depression when the totalizer contains a positive balance and unlocking the member when the totalizer contains a negative balance; program control means rendered operative by the member; means cooperating with the program control means for controlling the operation of the totalizer engaging and disengaging means, the actuating means, the storage device and the printing means, said program control means being so formed as to control the cooperating means to cause the clearing of the complement of an overdraft from the totalizer and adding said complement in the storage device, for then clearing the storage device and subtractively entering the complement in the cleared totalizer, to set up therein the true negative balance, for clearing said true negative balance from the totalizer and adding said true negative balance in the storage device, and thereafter clearing the storage device, printing the true negative balance and subtractively entering said true negative balance in the cleared totalizer; and means to drive the program control means during a four machine cycle operation.

4. In a calculating machine adapted to perform overdraft operations, the combination of an overdraft control member; means rendered effective by actuation of the member to initiate an overdraft operation; means to retain the member in actuated position during overdraft operations; and normally ineffective means moved to effective position, when the control member is operated, to prevent the initiating means from becoming effective until the retaining means has become effective, to prevent operation of the machine until the member is fully actuated.

5. In a machine of the character described, adapted to perform one-cycle operations and overdraft operations consisting of a plurality of cycles, the combination of an overdraft control member; releasing means to cause the machine to operate through one cycle; means including an element operated by actuation of the member to operate the releasing means and to cause said releasing means to be retained in operated position, to cause the machine to operate through a plurality of uninterrupted cycles to perform an overdraft operation; means to retain the member in actuated position; and means moved under control of the element into blocking relation with the retaining means to prevent the releasing means from becoming effective until the retaining means for the member has become effective, to prevent operation of the machine until the member is fully actuated.

6. In a machine of the class described, the combination of an add-subtract totalizer; an overdraft control member, depression of which causes the machine to perform an overdraft operation; means to lock the member in ineffective position; means controlled by the totalizer to render the locking means ineffective when the totalizer is overdrawn; means to retain the member in depressed position; means to move the retaining means to ineffective position near the end of an overdraft operation; means to restore the member to undepressed position when the retaining means has been moved to ineffective position; and means rendered effective by depression of the member and operated by said member while being returned to ineffective position to restore the locking means to effective position.

7. In a machine of the class described, the combination of printing means; an add-subtract totalizer; an overdraft control member, actuation of which causes the true negative balance of a complementary overdraft, contained in the totalizer, to be printed; a sub-overdraft control member, actuation of which causes the true negative balance of a complementary overdraft, contained in the totalizer, to be printed and the complementary overdraft returned to the totalizer; means for locking the members in effective positions; means for moving the locking means to ineffective position when the totalizer is overdrawn; means to retain the members in actuated positions; means to release the retaining means near the end of overdraft operations; yieldable means to return the overdraft control member to ineffective position upon release thereof; an element adapted to engage the overdraft control member when in actuated position, and to move in unison therewith while said member is being restored to ineffective position to restore the locking means to effective position; means to move the element to ineffective position each machine operation; and means rendered effective by actuation of the sub-overdraft control member to retain the element in ineffective position to prevent the locking means from being returned to effective position.

8. In a machine of the class described, the combination of an add-subtract totalizer; an overdraft control member, depression of which causes the machine to perform an overdraft operation during one continuous operation thereof; means to lock the member in ineffective position; means controlled by the totalizer to render the locking means ineffective when the totalizer is overdrawn; means including an element to restore the locking means to effective position, said element adapted to operatively engage the control member when said control member is depressed; means to retain the member in depressed position; means to move the retaining means to ineffective position near the end of an overdraft operation; and yieldable means to return the member to undepressed position upon movement of the retaining means to ineffective position, whereupon the member carries the element in unison therewith to cause said element to restore the locking means to effective position.

9. In a machine of the class described, the combination of an adding totalizer; actuators for said totalizer; a traveling carriage; means rendered effective by the traveling carriage when tabulated to certain columnar positions to cause the totalizer to cooperate with said actuators for addition; means to print the results of transactions carried on in the totalizer; means to disable the printing means during a part of certain operations; a non-add device for the totalizer, including a reciprocating member; and means rendered effective by the disabling of the printing means and including an element moved to a position to obstruct movement of the member to prevent the totalizer from cooperating with the actuators for addition, irrespective of the position of the traveling carriage.

10. In a machine of the class described, the combination of a totalizer; actuators for said totalizer; means to cause the totalizer to cooperate with the actuator for adding operations; a non-add device including a movable member; normally ineffective means to obstruct movement of the member to prevent addition to the totalizer; means to move the obstructing means to effective position; means to operate the moving means; means to drive the operating means; connections between the driving means and the moving means, whereby said moving means is moved out of cooperative relationship with its operating means when the driving means functions; means to disable the connections between the driving means and the moving means during a part of certain operations, whereupon the moving means remains in cooperative relationship with its operating means and is operated thereby to move the obstructing means into the path of the member to prevent the totalizer from being operable to perform addition; and means operated by the driving means to return the obstructing means to ineffective position at the end of said certain operation.

11. In a machine of the class described, the combination of a totalizer; actuating means for the totalizer; means to cause the totalizer to cooperate with the actuating means for adding operations; a non-adding device for blocking operation of the causing means; means to move the non-adding device to ineffective position each machine operation; normally ineffective means to obstruct movement of the non-adding device to ineffective position; means to print the result of transactions carried on in the totalizer; means to operate the printing means; means to disable the operating means for the printing means during a part of certain operations of the machine; means rendered effective when the operating means for the printing means is disabled to move the obstructing means to effective position to prevent movement of the non-adding device to ineffective position thereby preventing the totalizer from being rendered operable to perform addition during a part of said certain operations; and means operated by the printer operating means to return the obstructing means to ineffective position.

12. In a machine of the class described, adapted to perform operations consisting of one machine operation and overdraft operations consisting of four machine cycles, the combination of an add-subtract totalizer; an adding totalizer; means to print the results of transactions carried on in the totalizers; actuating means for entering amounts in and clearing amounts from said totalizers and setting the printing means to represent those amounts; a traveling carriage; means controlled by the traveling carriage when the carriage is in certain positions, to cause the adding totalizer to cooperate with the actuating means for addition; means to cause the add-subtract totalizer to cooperate with the actuating means to be cleared during the first machine cycle of an overdraft operation, whereupon the amount cleared from said add-subtract totalizer is added in the adding totalizer when the carriage is in said certain position during an overdraft operation; a non-adding device for the adding totalizer; means to move the non-adding device to ineffective position each machine operation; normally ineffective means to obstruct movement of the non-adding device to ineffective position; means to operate the printing means; means to disable the operating means for the printing means during the first three cycles of an overdraft operation; means rendered effective by the disabling of the printer operating means to move the obstructing means to effective position, to prevent movement of the non-adding device to ineffective position and thereby prevent the adding totalizer from being operable to perform addition during the last three machine cycles of an overdraft operation; and means operated by the printer operating means to return the obstructing means to ineffective position near the end of an overdraft operation.

13. In a machine of the class described, adapted to perform operations consisting of one machine cycle and operations consisting of a plurality of machine cycles, the combination of a balance totalizer; an adding totalizer; actuators for entering amounts in and clearing amounts from said totalizers; means to cause the adding totalizer to cooperate with the actuators for addition in plural cycle operations; means to cause the balance totalizer to cooperate with the actuators to be cleared during the first machine cycle of a plural machine cycle operation, the amount cleared from said balance totalizer by said actuators being entered into in the adding totalizer which also cooperates with the actuators for addition; a non-adding device including a member; means to move the member each cycle of operation to render the non-adding device ineffective; normally ineffective means to obstruct movement of the member; means to move the obstructing means to effective position; means to drive the moving means; means effective in one-cycle operations to shift the moving means out of cooperative relationship with its driving means, to render the obstructing means ineffective; means to disable the shifting means during a part of plural machine cycle operations, whereby the obstructing means is moved to effective position to render the non-adding device effective to prevent addition in the adding totalizer in all except the first machine cycle of plural machine cycle operations; and means operated by the shifting means to return the obstructing means to ineffective position near the end of said plural machine cycle operations.

14. In a machine of the class described, having printing means, an add-subtract totalizer, storage means, actuators for the totalizer and storage means, means to engage the totalizer with the actuators, and means to engage the storage device with the actuators, the combination of an overdraft key; a sub-overdraft key; control means rendered operable by the depression of either key to control a sequence of operations during four machine cycles of operation; means controlled by the control means to control the operation of the printing means, and the engaging means for the totalizer and storage device to control the engagement of the totalizer and storage means with the actuators at predetermined times during said four machine cycles of operation to cause an overdraft in the totalizer to be transposed into a true negative total and the true negative total to be printed; means for retaining said totalizer engaging control means in non-add condition during the fourth machine cycle; and means rendered operable by the sub-overdraft key to block the operation of the retaining means for the totalizer engagement control means to prevent the totalizer engagement control means from being in a non-add condition in the fourth machine cycle and enabling the totalizer engagement control means to render the totalizer operable to perform subtraction so that the complement of the true negative total can be set up in said totalizer.

15. In a machine adapted to print true negative totals and true negative sub-totals and having main operating means, printing means, an add-subtract totalizer, storage devices, and actuating means for said totalizer and storage devices, the combination of a manipulative device to initiate a true negative total operation comprising four machine cycles of operation; another manipulative device to initiate a true negative sub-total operation comprising four machine cycles of operation program control mechanism set in operation by said first-mentioned manipulative device; means controlled by said program control mechanism to cause the main operating means to operate through four machine cycles; means controlled by said program control mechanism to control the engagement and disengagement of the totalizer with the actuators at predetermined times during the operation of the program control mechanism; means controlled by the program control mechanism to control the engagement and disengagement of the storage device with the actuators at predetermined times during the operation of the program control mechanism; retaining means for holding the main operating means control means and the totalizer engagement control means to prevent their control by the program control mechanism; means on the first-mentioned manipulative device to render the retaining means ineffective when the program control mechanism is rendered operative; means in said program control mechanism operable to restore the main operating means control means and the totalizer engagement control means to the restraint of the retaining means near the beginning of the fourth machine cycle of operation; means to cause the first-mentioned manipulative device to be operated when said other manipulative device is operated; and means rendered effective by said other manipulative device to prevent the retaining means from holding the totalizer engaging means control means during the fourth machine cycle to allow the totalizer engaging means to operate under control of the program control mechanism in this machine cycle to cause the complement of the true negative total to be set up on the totalizer.

16. In a machine adapted to print true negative sub-totals, and having printing means, an add-subtract totalizer, a storage means, and actuating means for said totalizer and storage means, the combination of a manipulative control member to initiate a true negative sub-total operation comprising a plurality of machine cycles of operation; program control mechanism set in operation by said control member; means controlled by said program control mechanism to render the printing means operable to print in the last machine cycle of the true negative sub-total operation; means controlled by the program control mechanism to control the engagement and disengagement of said storage means and said actuators at predetermined times during the true negative sub-total operation; means controlled by the program control mechanism to control the engagement and disengagement of said totalizer and said actuators at predetermined times during the true negative sub-total operation; a latch normally preventing the control of the totalizer engagement control means by the program control mechanism; means operated by said control member to shift the latch to release the totalizer engagement control means to the control of said program control mechanism; means in said program control mechanism to restore the totalizer engagement control means to its normal condition near the beginning of the last machine cycle of the true negative sub-total operation; and means to retain the latch in shifted position to prevent it from retaining the totalizer engagement control means in said normal condition during the last machine cycle so that the program control mechanism can control the totalizer engagement control means to cause the totalizer to be engaged for subtraction during this last machine cycle of operation.

17. In a machine of the class described, the combination of an add-subtract totalizer; a non-accumulating storage device; actuators for said totalizer and storage device operable to transfer amounts from one to the other; means to cause the engagement of the totalizer and the actuators; means to cause the engagement of the storage device and the actuators; an overdraft control member; a sub-overdraft control member; means rendered effective by either the overdraft control member or sub-overdraft control member, when operated, to control the operation of the means for causing the engagement of the totalizer and actuators to thereby control the engagement of the totalizer and actuators; means rendered effective by either the overdraft control member or the sub-overdraft control member, when operated, to control the operation of the means for causing the engagement of the storage device and actuators to thereby control the engagement of the storage device and actuators; said means for controlling the means for causing engagement of the totalizer and actuators and said means for controlling the means for causing the engagement of the storage device and actuators operating in coordination to cause the selective engagement of the totalizer and the storage device and the actuators to clear the complement of the negative amount from the totalizer and convert the complement into a true negative amount; and means rendered effective by the sub-overdraft control member, when operated, to enable the means for controlling the means for causing engagement of the totalizer and actuators to further control the engagement of the totalizer and actuators to cause the complement of the negative amount to be set up on the totalizer.

18. In a machine of the class described, the combination of printing means; an add-subtract totalizer; a storage device; actuating means for said totalizer and storage device; means to engage the totalizer with said actuating means; means to engage the storage device with the actuating means; an overdraft control member; a sub-overdraft control member; means to control the operation of the printing means; mechanism to control the operation of the printer control means and the engaging means for the totalizer and storage device; devices operated by either of said members, when operated, for rendering said mechanism operative to control the printer control means and to render the engaging means for the totalizer and storage device effective to cause the selective operation of the totalizer, storage device, and printer so as to cause the complement of an overdraft standing on said totalizer to be cleared from said totalizer, be changed to a true negative amount, and be printed; and additional control means rendered effective by said sub-overdraft member, when operated, for controlling one of said devices to enable the mechanism to further control the totalizer engaging means to cause the complement of the overdraft to be set up in the totalizer in prepartion for further computation.

19. In a calculating machine operable to perform functions requiring one machine cycle or a plurality of machine cycles of operation, the combination of machine operating means; printing means; an add-subtract totalizer; a storage device; actuators common to said totalizer and storage device; means to engage the totalizer with the actuators; means to engage the storage device with the actuators; means to disable the printing means; means to release the machine operating means for one machine cycle of operation; means to retain the releasing means in operated position to cause the machine to perform a plurality of machine cycles of operation; a plurality of control cams operable during a plurality of machine cycles; a control device; means operated by the control device to cause the cams to be operated during the plurality of machine cycles; a member rendered operable by the control device for operating the releasing means, rendering the retaining means for the releasing means effective and operating the printer disabling means, said member being restored to normal position by said cams just prior to the last machine cycle of the plurality of machine cycles of operation; and means operated by the cams for controlling the totalizer engaging means and the storage device engaging means to control the selective engagement of the totalizer and storage device with the actuators for actuation thereby to clear the complement of a negative total from the totalizer and set the complement in the storage device, clear the complement from the storage device, and subtract the complement from the cleared totalizer to obtain the true negative total, clear the true negative total from the totalizer, and set it up on the storage device, and clear the true negative total from the storage device and subtract the true negative total from the cleared totalizer to set up the complement of the negative total in the totalizer for further computation; said printing means being operable during the subtraction of the true negative total from the totalizer so that the true negative total can be printed.

20. In a machine of the class described, the combination of printing means; an add-subtract totalizer; an auxiliary storage device; actuators for entering or clearing amounts from said totalizer and storage device and for setting the printing means to represent amounts; means to engage the totalizer with the actuators; means to engage the storage device with said actuators; means to control the operation of the printing means; a sub-overdraft control member; an integral assembly of cams; a main operating means; a driving means for said cams, operated by the main operating means; means operated by the control member to render the driving means operable to drive the cams; means operated by the cams as they are driven for coordinating and controlling the operation of the engaging means for the totalizer and the storage device to cause the selective engagement of the totalizer and the storage device with the actuators to successively clear the complement of the overdraft from the totalizer and set the complement on the storage device, clear the storage device, and subtract the complement from the cleared totalizer to obtain a true value of the overdraft, clear the totalizer of the true value of the overdraft, and set the amount on the storage device, and clear the storage device and subtract the true amount of the overdraft from the cleared totalizer to set up therein the complement of the overdraft; and means controlled by one of the cams for operating the printer control means to enable the printing means to operate when the true amount of the overdraft is being cleared from the storage devices.

21. In a machine of the class described, the combination of printing means; an add-subtract totalizer; a storage device; actuators for the totalizer and storage device; totalizer engaging means; storage device engaging means; total taking control means for controlling the totalizer engaging means; subtract control means for controlling the totalizer engaging means; a plurality of rotatable cams operable to make one revolution during four continuous machine cycles of operation of the machine; means operated by the cams, as they are rotated, for selectively controlling the printing means, the engaging means for the storage device, the total taking control means, and the subtract control means to cause the complement of an overdraft to be cleared from the totalizer and set up on the storage device, then the complement to be cleared from the storage device and subtracted from the cleared totalizer to obtain the true amount of the overdraft, next the true amount of the overdraft to be cleared from the totalizer and set up on the storage device, and finally the true amount of the overdraft to be cleared from the storage device, printed, and subtracted from the cleared totalizer to set up in the totalizer the complement of the overdraft; and means to drive the cams through one revolution during four continuous machine cycles.

22. In a machine of the class described, the combination of operating means; printing means; an add-subtract totalizer; a storage device; actuators operable to enter amounts into or clear amounts from said totalizer and storage device; means to engage said totalizer with said actuators; means to engage the storage device with the actuators; total taking control means for controlling said totalizer engaging means; subtract control means for controlling said totalizer engaging means; a sub-overdraft control member; program control means; means operated by the sub-overdraft control member to connect the program control means to the operating means for operation thereby; means coacting with the program control means for controlling the selective sequential operation of the total taking control means, the subtract control means, the storage device engaging means, and the printing means; said program control device being so formed that during its operation it will operate said coacting means and therethrough control the selective engagement of the totalizer and storage device with the actuators and control the operation of the printing device to cause a complement of an overdraft to be automatically cleared from the totalizer and simultaneously transferred to the storage device, the storage device then cleared and the complement simultaneously subtracted from the cleared totalizer to set up therein the true negative balance, next the true negative balance to be cleared from the totalizer and simultaneously transferred to the storage device and thereafter, under control of the storage device, the true negative balance to be printed and entered subtractively in the totalizer to set up therein the original complement.

23. In a machine of the class described operable to perform one machine cycle operations and four machine cycle operations, the combination of operating means; an add-subtract totalizer; a storage device; actuators cooperable with the totalizer and the storage device; means to engage the totalizer with the actuators; total-taking control means for controlling the totalizer engaging means and the operation of the totalizer to clear an amount from the totalizer by means of the actuators; subtract control means for controlling the totalizer engaging means and the operation of the totalizer to perform subtraction upon an operation of the actuators; means to render the operating means operable to make four continuous machine cycles of operation; a sub-overdraft key; program control means; means operated by said key for connecting the program control means to the operating means; means operated under control of said program control means for selectively causing the total taking control means and subtract control means to be effective during predetermined machine cycles of said four machine cycle operation; and means controlled by said program control means to engage and disengage the storage device from the actuators at proper times during said four machine cycle operation; said program control means causing the total taking control means and storage device engaging means to be operable during the first machine cycle so that the actuators can clear the complement of an overdraft from the totalizer and enter the complement in the storage device, causing the subtract control means and storage device engaging means to be operable during the second machine cycle so that the actuators can clear the storage device and enter the complement subtractively in said cleared totalized to form therein the true amount of the overdraft, causing the total taking control means and the storage device engaging means to operate in the third machine cycle so that the actuators can clear the true amount of the overdraft from the totalizer and enter this amount in the storage device, and causing the subtract control means and the storage device engaging means to operate in the fourth machine cycle so that the actuators can clear the true amount of the overdraft from the storage device and enter this amount subtractively in the cleared totalizer to set up therein the complement of the overdraft in preparation for further computations.

24. In a machine of the class described, adapted to perform overdraft operations consisting of four machine cycles of operation, the combination of an add-subtract totalizer; a storage device; printing means; actuating means for entering amounts into or clearing amounts from said totalizer and storage device and for setting the printing means to indicate amounts; operating means for said printing means; means to initiate an overdraft printing operation; program control means rendered effective by said initiating means to control a sequence of operations during the four machine cycles of an overdraft operation; means controlled by the program control means to cause the totalizer to cooperate with the actuating means to be cleared by the actuating means during the first and third machine cycles of an overdraft operation; means controlled by the program control means for causing the totalizer to cooperate with the actuating means to receive subtractive entries during other machine cycles of said overdraft operation; means controlled by the program control means for causing the storage device to be engaged with the actuating means at predetermined times during the four machine cycles of an overdraft operation; and means controlled by said program control means for disabling the operation of the printing means by the operating means during the first three machine cycles of an overdraft operation; the means controlled by the program control means being so coordinated in their operation that the complement of the overdraft is cleared from the totalizer and entered into the storage device, next the complement of the overdraft is cleared from the storage device and entered subtractively into the cleared totalizer to form therein the true amount of the overdraft, then the totalizer is cleared and the true amount of the overdraft is entered into the storage device, and finally the storage device is cleared and the true amount of the overdraft is printed and is entered subtractively into the cleared totalizer to set up therein the complement of the overdraft.

25. In a machine of the class described, the combination of printing means; an add-subtract totalizer; a storage device; actuators for entering amounts into and clearing amounts from said totalizer and storage device and for setting said printing means; means for causing the totalizer to engage the actuators; means for causing the storage device to engage the actuators; operating means for the printing means; an overdraft key; control means rendered operable by said key, when operated, for controlling the operation of the engaging means for the totalizer and the storage device and the operating means for the printing means so that the complement of the overdraft is cleared from the totalizer and set up in the storage device by the actuators, next the complement is cleared from the storage device and subtractively entered into the totalizer by the actuators to set up therein the true amount of the overdraft, then the totalizer is cleared and the true amount of the overdraft is set up on the storage device and as a final operation the storage device is cleared and the printing means rendered operable to print the true amount of the overdraft without entering this amount in the totalizer; a sub-overdraft key; means operated by the sub-overdraft key for operating the overdraft key and thus rendering the control means effective to cause the above operations; and means operated by the sub-overdraft key for rendering the control means operable to further control the totalizer engaging means to cause the true amount of the overdraft to be entered subtractively into the totalizer during the final operation in which the storage device is cleared and the true negative amount is printed.

26. In a machine of the class described, adapted to perform operations consisting of one machine cycle and overdraft operations consisting of a plurality of machine cycles, the combination of an add-subtract totalizer; an adding totalizer; printing means to record the results of transactions carried on in the totalizers; actuating means to enter amounts in and clear amounts from said totalizers and set the printing means to indicate amounts; means to cause the add-subtract totalizer to cooperate with the actuating means to be cleared during the first machine cycle of an overdraft operation; a traveling carriage; means rendered effective when the traveling carriage is tabulated to certain columnar positions to cause the adding totalizer to cooperate with the actuating means for addition, whereupon the amount cleared from the add-subtract totalizer by the actuating means is entered into the adding totalizer when the carriage is in one of said certain positions during the operation in which the add-subtract totalizer is cleared; means to disable the printing means during all but the last machine cycle of an overdraft operation; means rendered effective by the disabling of the printing means to prevent the adding totalizer from cooperating with the actuating means for addition in all except the first machine cycle of an overdraft operation; and means to restore the preventing means to ineffective condition during the last machine cycle of an overdraft operation.

27. In a machine of the class described, adapted to perform operations consisting of one machine cycle, and overdraft operations consisting of four machine cycles, the combination of an add-subtract totalizer; an adding totalizer; means to print the results of transactions carried on in the totalizers; actuating means to enter amounts in and clear amounts from said totalizers and set the printing means to indicate amounts; means to cause the add-subtract totalizer to cooperate with the actuating means to be cleared in the first machine cycle of an overdraft operation; a traveling carriage; means operated by the carriage when tabulated to certain columnar positions to cause the adding totalizer to cooperate with the actuating means for addition, whereupon the amount cleared from the add-subtract totalizer in the first cycle of overdraft operations is entered into the adding totalizer when the carriage is in one of said positions during an overdraft operation; means to disable the printing means during the first three machine cycles of an overdraft operation; and means rendered effective, when the printing means has been disabled, to block the operation of the causing means to thereby prevent the adding totalizer from cooperating with the actuating means for adding operations, irrespective of the columnar positions of the traveling carriage, in the last three machine cycles of an overdraft operation.

28. In a machine of the class described operable to perform overdraft operations consisting of four machine cycles of operation in which the complement of the overdraft is cleared from an add-subtract totalizer and converted into a true amount of the overdraft and the true amount of the overdraft is printed, the combination of an add-subtract totalizer; an adding totalizer; actuating means for entering values into and clearing values from said totalizers; means to initiate an overdraft operation; program control means, rendered operable by the initiating means, for controlling the sequence of operation during an overdraft operation; means controlled by said program control means for causing said add-subtract totalizer to cooperate with the actuating means to be cleared during the first machine cycle of an overdraft operation; means for causing the adding totalizer to cooperate with the actuating means to receive an entry during the several machine cycles of an overdraft operation so that the amount cleared from the add-subtract totalizer can be entered into said adding totalizer; blocking means for preventing the operation of the last-mentioned causing means; and means controlled by said program control means for rendering the blocking means effective during the last three machine cycles of the overdraft operation to prevent repeated entries into said adding totalizer.

29. In a machine of the class described, having means to make imprints on record material, the combination of a balance totalizer; a non-accumulating storage device; common actuators for the totalizer and the storage device; means to engage the totalizer with the actuators; means to engage the storage device with the actuators; a plurality of cams; means to drive the cams one revolution during four continuous machine cycles of operation of the machine; and means operated by said cams for controlling the operation of the imprinting means and the totalizer engaging means and storage device engaging means to control the time when the totalizer and the storage device are engaged with and disengaged from the actuators and to be selectively operated by the actuators to convert a complementary overdraft contained in the balance totalizer to a true negative amount, print said true negative amount upon the record material, and reenter the complement in the balance totalizer for further computation.

LAURENCE N. LEHMAN.

CERTIFICATE OF CORRECTION.

Patent No. 2,243,806.  May 27, 1941.

LAURENCE N. LEHMAN.

It is hereby certified that error appears in the printed specification of the above numbered patent requiring correction as follows: Page 12, second column, line 43, for "stud 369" read --stud 1369--; page 14, second column, line 45, after "total" insert --recording--; page 18, second column, line 54, after "466" insert --rocks the latch 471 clockwise to disengage the--; page 19, second column, line 74, before the word "negative" insert --true--; page 21, second column, line 44, for "interlock" read --interlocking--; page 23, second column, line 28, claim 2, after "use" strike out the comma and insert instead a semicolon; page 24, first column, line 48-49, claim 7, for the word "effective" read --ineffective--; same page second column, line 37, claim 10, for "addition to" read --addition in--; page 25, first column, line 15, claim 12, after "carriage" insert a comma; and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.